(12) United States Patent
Choi et al.

(10) Patent No.: US 10,650,817 B2
(45) Date of Patent: *May 12, 2020

(54) METHOD AND ELECTRONIC DEVICE FOR PROVIDING CONTENTS BASED ON NATURAL LANGUAGE UNDERSTANDING

(71) Applicant: Samsung Electronics Co., Ltd., Gyeonggi-do (KR)

(72) Inventors: Ha Young Choi, Gyeonggi-do (KR); Sun You Lee, Gyeonggi-do (KR); Ji Min Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 134 days.

This patent is subject to a terminal disclaimer.

(21) Appl. No.: 15/928,277

(22) Filed: Mar. 22, 2018

(65) Prior Publication Data

US 2018/0293983 A1 Oct. 11, 2018

(30) Foreign Application Priority Data

Apr. 6, 2017 (KR) .......................... 10-2017-0044689

(51) Int. Cl.
*G10L 15/00* (2013.01)
*G10L 15/22* (2006.01)
(Continued)

(52) U.S. Cl.
CPC ............ *G10L 15/22* (2013.01); *G06F 3/0484* (2013.01); *G06F 3/0488* (2013.01); *G06F 3/167* (2013.01);
(Continued)

(58) Field of Classification Search
CPC ... G10L 15/22; G10L 2015/223; G10L 15/26; G10L 15/265; G10L 15/30; G10L 17/22;
(Continued)

(56) References Cited

U.S. PATENT DOCUMENTS 9,621,492 B2  4/2017  Park et al.
2006/0041926 A1*  2/2006  Istvan ................... H04N 5/4403
                                                  725/133

(Continued)

FOREIGN PATENT DOCUMENTS

KR   10-2013-0061387 A   6/2013
KR   10-2015-0037804 A   4/2015
KR   10-2015-0109080 A   10/2015

*Primary Examiner* — Edgar X Guerra-Erazo
(74) *Attorney, Agent, or Firm* — Cha & Reiter, LLC

(57) ABSTRACT

Disclosed is an electronic device includes a display, a communication circuit, a processor, and a memory. The memory stores instructions that cause the processor to receive a natural language input from a user, to transmit at least a portion of the natural language input to an external server, to display a first message based on the natural language input and a first indication indicating the user, to receive a first response from the external server, to display a second indication indicating a first engine and a second message based on the first response, to receive a second response from the external server, and to display a third indication indicating a second engine and a third message based on the second response. The first response is generated by the first engine based on the natural language input, and the second response is generated by the second engine based on the natural language input.

19 Claims, 27 Drawing Sheets

(51) Int. Cl.
  *G06F 3/0484*   (2013.01)
  *G06F 3/0488*   (2013.01)
  *G10L 15/18*    (2013.01)
  *G10L 15/32*    (2013.01)
  *G06F 3/16*     (2006.01)
  *G10L 15/30*    (2013.01)

(52) U.S. Cl.
  CPC ...... *G10L 15/1815* (2013.01); *G10L 15/1822* (2013.01); *G10L 15/32* (2013.01); *G10L 15/30* (2013.01); *G10L 2015/223* (2013.01); *G10L 2015/225* (2013.01); *G10L 2015/228* (2013.01)

(58) Field of Classification Search
  CPC ....... G10L 13/00; G10L 13/043; G10L 15/00; G06F 3/167; G06F 3/04842
  See application file for complete search history.

(56) References Cited

U.S. PATENT DOCUMENTS

| | | | |
|---|---|---|---|
| 2013/0144961 A1 | 6/2013 | Park et al. | |
| 2013/0185081 A1* | 7/2013 | Cheyer | G06F 16/3344 704/275 |
| 2016/0043975 A1 | 2/2016 | Park et al. | |
| 2016/0180853 A1* | 6/2016 | VanLund | G10L 17/22 704/275 |
| 2016/0196110 A1 | 7/2016 | Yehoshua et al. | |
| 2018/0314389 A1* | 11/2018 | Woo | G06F 3/0481 |

\* cited by examiner

| STEP | EXAMPLE |
|---|---|
| 1801 A USER ASK A QUESTION IN A CHAT BOX IN WHICH THERE IS NO CP CHATBOT CAPABLE OF ANSWERING THE USER'S QUESTION | U: LET ME KNOW TOMORROW'S SEOUL WEATHER. |
| 1802 IN THE CASE WHERE THERE IS ONE AVAILABLE CP CHATBOT, INVITE THE CP CHATBOT | M: WEATHER CHATBOT#1 IS AN EXPERT ON WEATHER. CALL WEATHER CHATBOT#1. <br> W#1: HI. <br> W#1: TOMORROW'S SEOUL WEATHER IS MINUS 5 DEGREES IN THE MORNING AND 4 DEGREES IN DAYTIME AND IS 1-2 DEGREES LOWER THAN TODAY. THE SENSIBLE TEMPERATURE IS EXPECTED TO DECREASE AS THE WIND BLOWS STRONGLY. |
| 1803 IN THE CASE WHERE THERE ARE TWO OR MORE AVAILABLE CP CHATBOTS, SHOW A LIST AND INDUCE A USER TO SELECT ONE AMONG THE TWO OR MORE AVAILABLE CP CHATBOTS | M: WEATHER CHATBOT#1 AND WEATHER CHATBOT#2 CAN DO IT. WHO DO I CALL? <br> 1. Weather Chatbot#1 <br> 2. Weather Chatbot#2 <br> U: INVITE WEATHER CHATBOT#1 (TEXT AND TOUCH UI) <br> M: YES, I INVITE WEATHER CHATBOT#1 <br> W#1: HI. <br> W#1: TOMORROW'S SEOUL WEATHER IS MINUS 5 DEGREES IN THE MORNING AND 4 DEGREES IN DAYTIME AND IS 1-2 DEGREES LOWER THAN TODAY. THE SENSIBLE TEMPERATURE IS EXPECTED TO DECREASE AS THE WIND BLOWS STRONGLY. |

FIG. 18

| | STEP | EXAMPLE |
|---|---|---|
| 1901 | MASTER CHATBOT MAKES RECOMMENDATIONS BASED ON A USER'S LIFE PATTERN. | M: THERE IS A NEW GAME-BOT. DO YOU WANT TO MEET A NEW GAME-BOT? |
| 1902 | -IN THE CASE OF CONSENT | U: REGISTER<br>M: YES, I INVITE GAME-BOT#1.<br>G#1: HI. |
| 1903 | -IN THE CASE OF REJECTION (THE USER MAY CONSENT AT A LATER TIME) | U: NO, IT'S OK. DO NOT RECOMMEND CP CHATBOT ANY MORE.<br>M: YES, PLEASE TELL ME WHENEVER YOU NEED IT. |

FIG. 19

| STEP | EXAMPLE |
|---|---|
| 2001 WHILE A USER HAVE A TALK WITH CP CHATBOTS, A CP CHATBOT RECOMMENDS ANOTHER CHATBOT. | H#1: WOULD YOU DRIVE TO THE HOTEL BY YOURSELF? OR WOULD YOU USE PUBLIC TRANSPORTATION?<br><br>U: I'LL DRIVE BY MYSELF<br><br>H#1: THEN, I RECOMMEND GAS CHATBOT#1.<br><br>U: YES, CALL GAS CHATBOT #1.<br><br>H#1: YES, I'LL INVITE GAS CHATBOT#1.<br><br>Gas#1: HI, I WILL FIND THE CHEAPEST GAS STATION ON THE ROUTE. PLEASE SELECT DIESEL/PETROL/LPG. |

FIG. 20

| | STEP | EXAMPLE |
|---|---|---|
| 2101 | A USER DIRECTLY REQUESTS MASTER CHATBOT TO INVITE KNOWN CP CHATBOT. | U: PLEASE CALL CAFE CHATBOT#1. |
| 2102 | MASTER CHATBOT RECOMMENDS THE CORRESPONDING CP CHATBOT DEPENDING ON THE REQUEST OF THE USER. | M: YES, I'LL CALL CAFE CHATBOT#1.<br>C#1: HI, IT'S ALWAYS A GOOD DAY. |
| 2103 | -IF IT IS IMPOSSIBLE TO FIND A CP CHATBOT THAT A USER REQUESTS, MASTER CHATBOT ASKS A QUESTION AND RECOMMENDS SEVERAL SIMILAR CP CHATBOTS. | U: PLEASE CALL A SANDWICH.<br>M: ARE YOU TALKING ABOUT SANDWICH CHATBOT # 1? OTHERWISE, THERE ARE MORE SIMILAR FRIENDS.<br>1. Sandwich Chatbot#2<br>2. Sandwich Chatbot#3<br>3. Sandwich Chatbot#4<br>U: AHH, Sandwich Chatbot#4<br>M: YES, I WILL CALL SANDWICH CHATBOT#4.<br>S#4: HI, HERE IS TODAY'S RECOMMENDED MENU. |

FIG. 21

| STEP | EXAMPLE |
|---|---|
| 2201 THERE IS ONLY ONE CAFE CHATBOT. | U: PLEASE ORDER COFFEE. |
| 2202 A CAFE CHATBOT DERIVES THE CONTEXT OF THE USER REQUEST. | C#1: YES, PLEASE TELL ME.<br>U: THREE CUPS OF ICE AMERICANO, TWO CUPS OF CARAMEL MACCHIATO AND A CUP OF HOT CHOCOLATE<br>C#1: IS IT RIGHT? YOU CAN ADD MORE THINGS YOU NEED.(CAFE CHATBOT OUTPUTS A MENU FOR A USER TO SELECT OPTIONS BY TEXT OR TOUCH)<br>U: PLEASE USE LOW FAT MILK FOR MILK OF HOT CHOCOLATE<br>C#1: YES, I WILL PROCEED WITH THE ORDER AT THE JONGNO 1-GA BRANCH. ARE YOU OKAY TO PICK UP A DRINK AT 3:10?<br>U: OKAY<br>C#1: YES, PLEASE PROCEED WITH THE PAYMENT. |
| 2203 AFTERWARD, PROCEED WITH THE PAYMENT BY USING A MESSENGER AND A PAYMENT API REGISTERED TO THE USER. | |

FIG. 22

| | STEP | EXAMPLE |
|---|---|---|
| 2301 | THERE ARE THREE CAFE CHATBOTS. | U: PLEASE ORDER COFFEE. |
| 2302 | MASTER CHATBOT RECEIVES INFORMATION FROM THREE CPS AND ASKS A USER WHICH ONE OF THREE CPS DO YOU ORDER TO. | M: NOW, YOU MAY ORDER COFFEE FROM THREE CPS CAFE CHATBOTS #1, #2, AND #3. WHO WOULD YOU LIKE TO ORDER COFFEE? |
| 2303 | THE USER SELECTS A CP CHATBOT AMONG THREE CPS. | U: TODAY, WE HAVE TO ORDER AT CAFE CHATBOT #3 IN FRONT OF A WORKPLACE. |
| 2304 | AT THIS TIME, A PARTICULAR BRANCH MAY BE DESIGNATED BY USING "CAFE CHATBOT #3 IN FRONT OF THE WORKPLACE," WHICH IS INCLUDED IN THE UTTERANCE OF THE USER. | C#3: HI, Cafe Chatbot#3 I WILL PROCEED WITH THE ORDER AT THE MAETAN 1-DONG BRANCH.<br><br>U: PLEASE ORDER THREE CUPS OF ICE AMERICANO, A CUP OF LATTE, AND THREE CUPS OF MOCHA.<br><br>C#3: IS IT RIGHT? YOU CAN ADD MORE THINGS YOU NEED. (CAFE CHATBOT OUTPUTS A MENU FOR A USER TO SELECT OPTIONS BY TEXT OR TOUCH)<br><br>U: THE LATTE IS ICE LATTE<br><br>C#3: YES, I GOT IT(OUTPUT THE ORDER LIST THROUGH A TOUCH UI OR AN IMAGE) THE ORDER IS PLACED AT THE BRANCH OF JONGNO 1-GA. ARE YOU OKAY TO PICK UP A DRINK AT 3:10.<br><br>U: OKAY<br><br>C#3: YES, PLEASE PROCEED WITH THE PAYMENT. |
| 2305 | AFTERWARD, PROCEED WITH THE PAYMENT BY USING A MESSENGER AND A PAYMENT API REGISTERED TO THE USER. | |

FIG. 23

| STEP | EXAMPLE |
|---|---|
| 2401 A USER RELEASES THE UNDESIRED CP CHATBOT BY PROVIDING A TEXT/TOUCH INPUT | U: WEATHER CHATBOT #1, PLEASE EXIT FROM A CHAT ROOM<br>W#1: YES, I ENJOYED IT. SEE YOU AGAIN.<br>M: IF YOU ARE WONDERING ABOUT THE WEATHER, YOU MAY INVITE THE WEATHER CHATBOT ANY TIME. |

FIG. 24

METHOD AND ELECTRONIC DEVICE FOR PROVIDING CONTENTS BASED ON NATURAL LANGUAGE UNDERSTANDING

CROSS-REFERENCE TO RELATED APPLICATION(S)

This application claims the benefit under 35 U.S.C. § 119(a) of a Korean patent application filed on Apr. 6, 2017 in the Korean Intellectual Property Office and assigned Serial number 10-2017-0044689, the entire disclosure of which is hereby incorporated by reference.

TECHNICAL FIELD

The present disclosure generally relates to a content providing method based on natural language understanding, and an electronic device and a server that perform the same.

BACKGROUND

With the development of mobile communication technologies, electronic devices are now provided in the art that can freely connect to wireless/wired networks and are small enough to be easily portable. For example, portable electronic devices such as smartphones, tablet PCs, or the like have been built to support various functions such as Internet access, multimedia content playback, voice and message communication, etc.

When the electronic device is connected to a network such as the Internet, it may provide a function that allows the user to search for content or service that the user desires. To initiate this function, the user of the electronic device may transmit a search keyword to a search engine and may receive the content or service corresponding to the search keyword. However, in this case, for example if the user does not know the name of the content or service he desires, it may be difficult for the user to directly generate the suitable search keyword. As an alternative, a dialog-type content providing system may be provided where the user enters natural language input, such as a natural language question. The system then performs semantic analysis on the natural language question to generate the search parameters corresponding to the natural language question.

SUMMARY

According to one or more embodiments of the present disclosure, a dialog-type content providing system may analyze the meaning of a natural language input received from a user to provide the content or service corresponding to the natural language input. The interface of the content providing system may be in a dialog format. Conventionally, a single dialog-type content providing system is managed by a single content provider or a single service provider. In this case, when the user is searching for content or service that is not provided by the single content provider, the dialog-type content providing system may not be able to provide the content or service, which may cause user frustration.

Aspects of the present disclosure are to address at least the above-mentioned problems and/or disadvantages and to provide at least the advantages described below. Accordingly, in accordance with an aspect of the present disclosure, a content providing method is disclosed where if a natural language dialog entity, for example a chatbot, is unable to provide a specified service because that service is out of scope for that particular entity, the dialog entity may be capable of calling or inviting another entity capable of providing that service. In accordance with another aspect of the present disclosure, a user may receive dialog-type content or service from a plurality of dialog entities based on a natural language. Electronic devices for performing the same are also disclosed.

In accordance with an aspect of the present disclosure, an electronic device includes a housing, a display exposed through a part of the housing, a communication circuit disposed inside the housing, a processor disposed inside the housing and electrically connected to the display and the communication circuit, and a memory disposed inside the housing and electrically connected to the processor. The memory is configured to store a messaging application program including a messaging user interface (UI). The memory stores instructions that, when executed, cause the processor to display the messaging UI of the messaging application program on the display, to receive a natural language input from a user, to transmit at least a portion of the natural language input to an external server by using the communication circuit, to display, on the messaging UI, a first message based on the natural language input and a first indication indicating the user, to receive a first response from the external server via the communication circuit, to display, on the messaging UI, a second indication indicating a first engine and a second message based on the first response, to receive a second response from the external server via the communication circuit, and to display, on the messaging UI, a third indication indicating a second engine and a third message based on the second response. The first response is generated by the first engine based on the transmitted portion of the natural language input. The second response is generated by the second engine based on the transmitted portion of the natural language input.

In accordance with an aspect of the present disclosure, an electronic device includes a housing, a display exposed through a part of the housing, a communication circuit disposed inside the housing, a processor disposed inside the housing and electrically connected to the display and the communication circuit, and a memory disposed inside the housing and electrically connected to the processor. The memory is configured to store a messaging application program including a messaging UI. The memory further stores instructions that, when executed, cause the processor to display the messaging UI of the messaging application program on the display, to receive a first natural language input from a user, to transmit at least a portion of the first natural language input to an external server by using the communication circuit, to display, on the messaging UI, a first message based on the first natural language input and a first indication indicating the user, to receive a first response from the external server via the communication circuit, to display, on the messaging UI, a second indication indicating a first engine and a second message based on the first response, to receive, from the user, a second natural language input indicating a selection of a second engine, to display, on the messaging UI, the first indication and a third message based on the second natural language input, to transmit at least a portion of the second natural language input to the external server by using the communication circuit, to receive a second response from the external server via the communication circuit, and to display, on the messaging UI, a third indication indicating the second engine and a fourth message based on the second response. The first response is generated by the first engine based on the transmitted portion of the first natural language input and the first response indicates the second engine capable of generating a response corresponding to the first natural language input. The second response is generated by the second engine based on the transmitted portion of the first natural language input.

In accordance with an aspect of the present disclosure, a server includes a housing, a communication circuit disposed inside the housing and configured to communicate with an electronic device, a processor disposed inside the housing and electrically connected to the communication circuit, and a memory disposed inside the housing and electrically connected to the processor. The memory stores a first NLU pool corresponding to a first domain. The memory stores instructions that, when executed, cause the processor to receive a natural language input from the electronic device by using the communication circuit, to determine whether context of the first domain is derived from the natural language input, if the context is derived, to generate a first response by using the natural language input and the first NLU pool, and to transmit the first response to the electronic device.

According to various embodiments of the present disclosure, an electronic device may receive the content or service from a natural language processing (NLP) server (or a chatbot) of a content provider (CP). The content or service may be best suited for a natural language input received from the user of the electronic device. In addition, a variety of features and advantages directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18, FIG. 19, FIG. 20, FIG. 21, FIG. 22, FIG. 23 and FIG. 24 illustrate dialogs between an electronic device and chatbot servers, according to various embodiments;

Throughout the drawings, it should be noted that like reference numbers are used to depict the same or similar elements, features, and structures.

DETAILED DESCRIPTION

Figure 1:
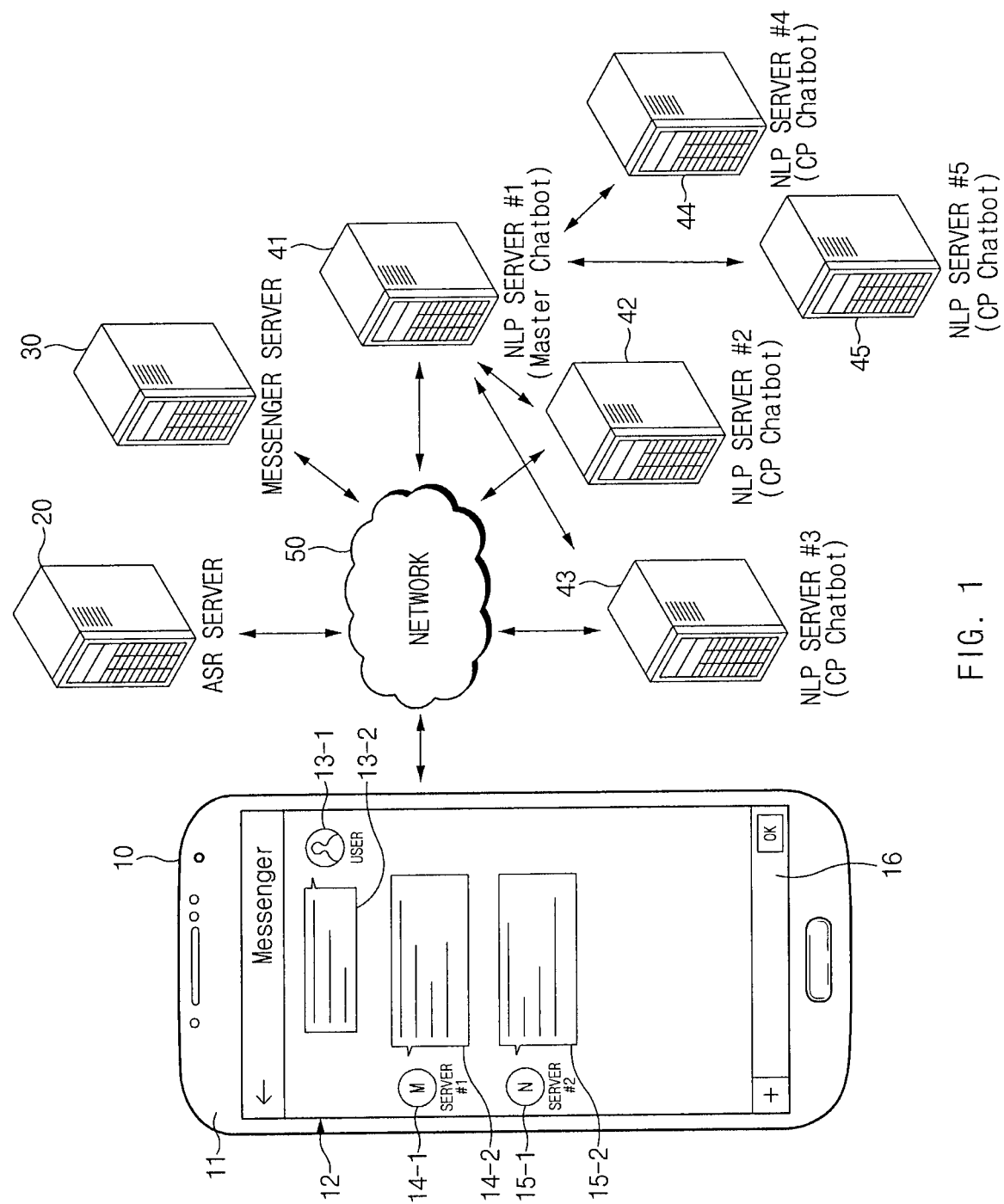
FIG. 1 is a diagram illustrating a content providing system based on natural language understanding, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

In this disclosure, the expressions "have," "may have," "include," "comprise," "may include," or "may comprise" used herein indicate existence of corresponding features (e.g., elements such as numeric values, functions, operations, or components) but do not exclude presence of additional features.

In this disclosure, the expressions "A or B," "at least one of A or/and B," or "one or more of A or/and B," and the like may refer to any and all combinations of one or more of the associated items. For example, the term "A or B," "at least one of A and B," or "at least one of A or B" may refer to the case (1) where at least one A is included, the case (2) where at least one B is included, and/or the case (3) where both of at least one A and at least one B are included.

The terms, such as "first," "second," and the like used in this disclosure may refer to corresponding elements without implying an order and/or the priority, and are used to merely distinguish the relevant elements from other elements without unduly limiting the elements. For example, "a first user device" and "a second user device" indicate different user devices regardless of the order or priority. In another example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for," "having the capacity to," "designed to," "adapted to," "made to," or "capable of" The term "configured to" must not mean only "specifically designed to" in hardware. Instead, the expression "a device configured to" may mean that the device is "capable of" performing the corresponding operation alone or together with another device or other components. For example, a "processor configured to (or set to) perform A, B, and C" may mean a dedicated processor (e.g., an embedded processor) for performing the corresponding operations or a generic-purpose processor (e.g., a central processing unit (CPU) or an application processor) which performs the corresponding operations by executing one or more software programs which are stored in a memory device.

Terms used in this disclosure are used to describe specified embodiments and are not intended to limit the scope of the present disclosure. Terms in singular form may also refer to the plural unless otherwise specified. All the terms used herein, which include technical or scientific terms, may have the same meaning that is generally understood by a person skilled in the art. Further, it should be understood that when applicable, terms should be given their contextual meanings in the relevant art. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA) device, a magnetic resonance imaging (MRI) device, a computed tomography (CT) device, scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a diagram illustrating a content providing system based on natural language understanding, according to an embodiment.

Referring to FIG. 1, according to an embodiment, the content providing system based on natural language understanding (hereinafter referred to as "NLU") may include an electronic device 10, an automated speech recognition (ASR) server 20, a messenger server 30, and a natural language processing (NLP) servers 41, 42, 43, 44, and 45. Each of the devices 10, 20, 30, 41, 42, 43, 44, and 45 may communicate with each other through a network 50.

The ASR server 20 may receive an audio signal from the electronic device 10, convert the audio signal to text data, and return text data corresponding to an audio signal to the electronic device 10. The ASR server 20 may be referred to as a "speech to text (STT) server" or a "speech recognition (SR) server". According to an embodiment, at least some of the functionalities of the ASR server 20 may be performed by the electronic device 10.

The messenger server 30 may mediate communication between the electronic device 10 and other electronic devices (e.g., another electronic device and NLP servers). For example, a messaging application supported by the messenger server 30 may be installed in the electronic device 10 and the NLP servers 41, 42, 43, 44, and 45. The messages written in the messaging application may be transmitted by the electronic device 10 to a destination device through the messaging application.

Each of the NLP servers 41, 42, 43, 44, and 45 may receive natural language input from the electronic device 10 and may derive the meaning or context of the natural language input to perform an operation corresponding to the meaning or context. According to an embodiment, each of the NLP servers 41, 42, 43, 44, and 45 may include a chatbot of a content provider (CP), and the NLP server 41 may further include a master chatbot.

According to an embodiment, the NLP servers 42, 43, 44, and 45, each of which including a CP chatbot, may be also referred to as a "CP chatbot." And the NLP server 41, in which the master chatbot is included, may be also referred to as a "master chatbot." In addition, in this specification, the NLP servers 41, 42, 43, 44, and 45 may be also referred to as a "chatbot," "NLP machine," "chatbot engine" or simply as a "server," "engine," or "machine."

According to an embodiment, the CP chatbots (the second to fifth NLP servers 42, 43, 44, and 45) may derive the meaning or context of the natural language input received from the electronic device 10. The CP chatbots may also provide the electronic device 10 with the content corresponding to the meaning or context. To this end, each of the CP chatbots 42, 43, 44, and 45 may include an NLU pool including the set of natural languages associated with the service provided by each of the CP chatbot, an NLU engine for semantic analysis of the natural language, various programs and data for providing the service, and the like.

According to an embodiment, the master chatbot (first NLP server) 41 may derive the meaning or context of the natural language input received from the electronic device 10 and may select the CP chatbots 42, 43, 44, and 45 capable of providing the content corresponding to the meaning or context. The master chatbot 41 may then recommend the selected chatbot to the electronic device 10. To this end, the master chatbot 41 may include a domain filter capable of classifying domains of services provided by each of the CP chatbot, a database (DB) storing information about the correlation between the domains and the CP chatbots, an NLU pool, an NLU engine, and various other programs, data, and the like.

According to an embodiment, the NLU engine included in each of the master chatbot 41 and the CP chatbots 42, 43, 44, and 45 may include artificial intelligence supporting machine learning.

According to an embodiment, for the purpose of receiving the natural language input and providing the content corresponding to the natural language input, the master chatbot 41 and each of the CP chatbots 42, 43, 44, and 45 may interact with the electronic device 10 via the messenger server 30. In the messaging application user interface (UI) of the electronic device 10, each of the master chatbot 41 and the CP chatbots 42, 43, 44, and 45 may be shown as messaging counterparties, i.e. entities that the user may send messages to.

The electronic device 10 may communicate with other electronic device(s) (e.g., another electronic device or the chatbots (NLP servers) 41, 42, 43, 44, and 45) through the network 50. The electronic device 10 may physically include a housing 11 and a touchscreen display 12 exposed through a part (e.g., a front surface) of the housing 11.

The housing 11 may be made of metal, tempered glass, reinforced plastic, etc., or a combination of these elements, so as to house the components of the electronic device 10. The housing 11 may protect the components included in the electronic device 10 from dust, water, and external shocks. Through the touchscreen display 12, the electronic device 10 may receive a user input or may output content, such as execution screen of various programs of the electronic device 10.

According to an embodiment, the electronic device 10 may execute or launch the messaging application and may output a messaging UI of the messaging application (i.e., a screen showing various functionalities of the messaging application) on the touchscreen display 12. The electronic device 10 may receive the natural language input through the messaging UI. For example, the user may enter a natural language input as a text message.

According to an embodiment, the electronic device 10 may receive the text message, inputted to an input field 16 by the user using a soft keyboard (not illustrated), as the natural language input. According to another embodiment, the user may input the natural language input as speech, and the electronic device 10 may capture the speech using an internal or external audio input module (e.g., a microphone). The electronic device 10 may transmit the audio signal of the speech to the ASR server 20 and may receive natural language text data from the ASR server. The electronic device 10 may then use the natural language text data as the natural language input.

According to an embodiment, when receiving the natural language input from the user, the electronic device 10 may display an indication 13-1 (e.g. an icon) indicating the user and a message 13-2 that is inputted by the user via a keyboard or converted from the user's speech.

According to an embodiment, the natural language input received from the electronic device 10 may be transmitted to the messenger server 30 through the network 50, and then may be transmitted to at least one of the master chatbot 41 and the CP chatbots 42, 43, 44, and 45 again.

For example, the master chatbot (first NLP server) 41 may derive the meaning or context of the natural language input received from the electronic device 10 and may select a CP chatbot (e.g., the CP chatbot 44) capable of providing the content corresponding to the meaning or context. The master chatbot 41 may generate a response for recommending the selected CP chatbot (e.g., the CP chatbot 44), and may transmit the response to the electronic device 10. The electronic device 10 may display, on the messaging UI, an indication 14-1 indicating the master chatbot 41 and a response message 14-2 showing the recommendation of the selected CP chatbot (e.g., the CP chatbot 44).

For another example, the CP chatbot (second NLP server) 42 may directly derive meaning or context from the natural language input that is associated with the content provided by the CP chatbot 42. The CP chatbot 42 may then directly generate a response for providing the corresponding content and provide the response to the user. In this case, the electronic device 10 may display, on the messaging UI, an indication 15-1 indicating the CP chatbot 42 and a response message 15-2 indicating the content.

According to another embodiment, the CP chatbot 43 may fail to derive meaning or context from the natural language input that is associated with the service provided by the CP chatbot 43. For example, when the natural language input is an input requesting a restaurant reservation and the CP chatbot 43 provides a movie booking service, the CP chatbot 43 may not reply to the natural language input. However, according to yet another embodiment, the CP chatbot 43 may recommend another CP chatbot that corresponds to the natural language input (e.g. a CP chatbot providing a restaurant reservation service).

Figure 2:
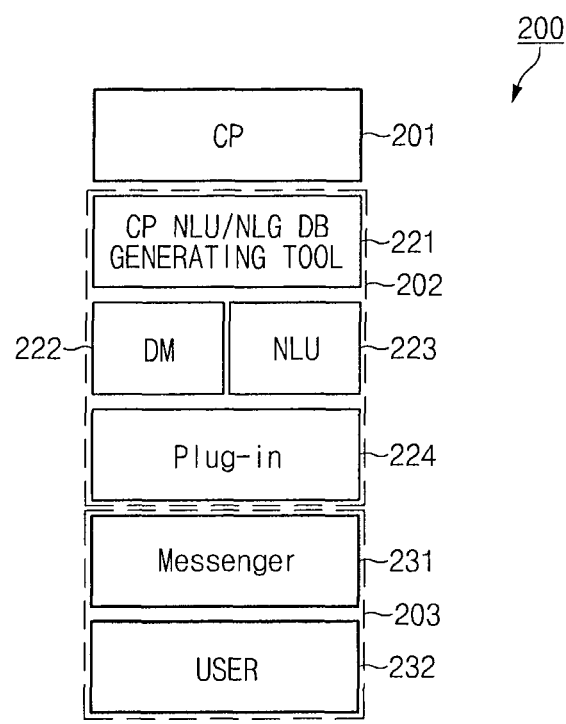
FIG. 2 is a block diagram illustrating the structures of a chatbot system, according to an embodiment.

FIG. 2 is a block diagram illustrating the structures of a chatbot system, according to an embodiment.

Referring to FIG. 2, a chatbot system 200 according to an embodiment may include a CP chatbot 201, a master chatbot 202, and an electronic device 203 of a user 232. For example, the CP chatbot 201 may correspond to one of the CP chatbots 42, 43, 44, and 45 illustrated in FIG. 1; the master chatbot 202 may correspond to the master chatbot 41 illustrated in FIG. 1; and the electronic device 203 may correspond to the electronic device 10 illustrated in FIG. 1.

According to an embodiment, the CP chatbot 201 may provide the electronic device 203 with content (e.g. text, image, video, or instructions (e.g, intent) capable of being executed by the electronic device 203) in response to a natural language input received from the electronic device 203 and/or the master chatbot 202. For example, the CP chatbot 201 may build a DB and NLU pool of content to be provided by using an application programming interface (API) provided from the master chatbot 202. The chatbot 201 may dynamically customize the DB and NLU pool of the content. According to an embodiment, the CP chatbot 201 may proactively access the master chatbot 202 to receive information relevant to its DB and NLU pool.

According to an embodiment, the master chatbot 202 may include a CP NLU/NLG (natural language generation) DB generating tool 221, a dialog manager (DM) 222, an NLU module 223, and a messenger plug-in 224.

According to an embodiment, the CP NLU/NLG DB generating tool 221 may support natural language data input/output management with the CP chatbot 201. The CP NLU/NLG DB generating tool 221 may also support the registration and operation of the CP chatbot 201 with respect to the messenger 231.

According to an embodiment, by using a domain filter, the CP NLU/NLG DB generating tool 221 may adjust the type and the number of the CP chatbots 201 relevant to the natural language input received from the electronic device 203. For example, by using topic detection based on the context of the natural language input, the CP NLU/NLG DB generating tool 221 may determine a plurality of CP chatbot 201 relevant to the natural language input. Then, the CP NLU/NLG DB generating tool 221 may transmit the natural language input to only the plurality of CP chatbot 201. From each of the plurality of CP chatbot 201, the CP NLU/NLG DB generating tool 221 may receive a response to the natural language input and a confidence level of the response. The CP NLU/NLG DB generating tool 221 may then select a particular CP chatbot 201 best suited for the natural language input based on the confidence level. When more than one CP chatbot 201 reply with confidence levels that exceed a predetermined threshold, the CP NLU/NLG DB generating tool 221 may select a particular CP chatbot based on a predetermined priority.

According to an embodiment, the DM 222 may determine the following operation by using user intent grasped by the NLU module 223. The DM 222 may interact with the NLU module 223 based on artificial intelligence for the purpose of constructing a dialog message with the electronic device 203.

According to an embodiment, the messenger plug-in 224 may allow the master chatbot 202 to interact with various types of messenger applications 231 installed in the electronic device 203. Since the CP chatbot 201 interacts with the electronic device 203 through the master chatbot 202, the developer of the CP chatbot 201 may not need to implement all of the plug-ins necessary for the various types of messenger applications.

Figure 3:
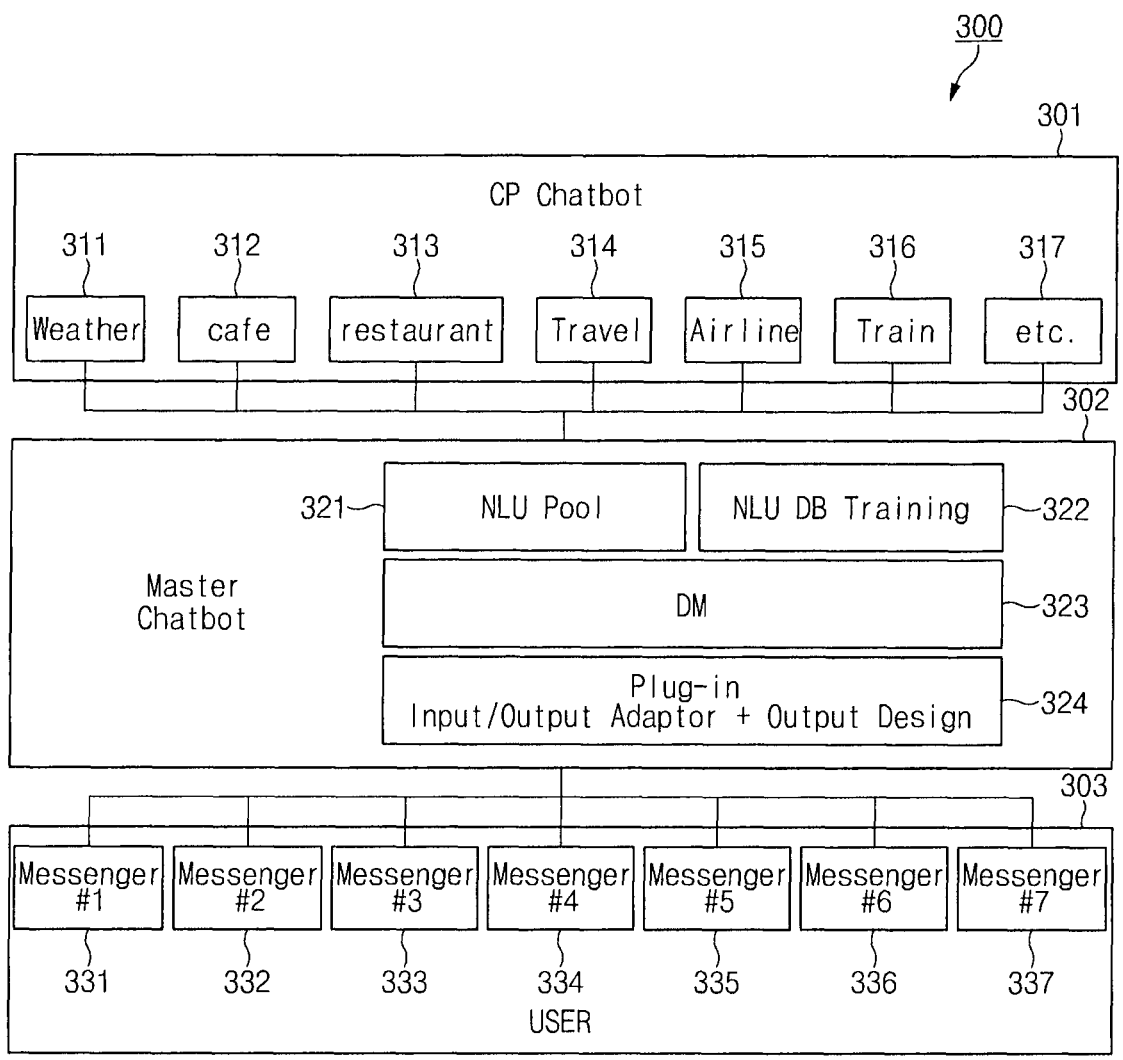
FIG. 3 is a block diagram illustrating the structures of a chatbot system, according to another embodiment.

FIG. 3 is a block diagram illustrating the structures of a chatbot system, according to another embodiment.

Referring to FIG. 3, a chatbot system 300 according to an embodiment may include CP chatbots 301, a master chatbot 302, and an electronic device 303 of a user.

According to an embodiment, the CP chatbots 301 may include CP chatbots 311 to 317 each of which provides specialized content. The CP chatbots 311 to 317 may be implemented by different providers (i.e. third parties). Each of the CP chatbots 311 to 317 may include an NLU pool, an NLU engine, a DM, and the like so as to provide content corresponding to various natural language inputs received from the user.

For example, the weather chatbot 311 may provide content associated with weather information; the cafe chatbot 312 may provide content associated with beverage orders; the restaurant chatbot 313 may provide content associated with food information and reservations provided by the restaurant; the travel chatbot 314 may provide travel reservation information; the airline chatbot 315 may provide content such as flight schedule and ticketing information; the train chatbot 316 may provide content such as train schedule and ticketing information, etc. Other chatbots 317 may also be available.

According to an embodiment, the master chatbot 302 may include an NLU pool 321 (or an NLU model), an NLU DB training module 322, a DM 323, and a messenger plug-in 324.

According to an embodiment, the NLU pool 321 (or the NLU model) may device the context, meaning, or the like from the natural language input in association with an NLU engine (not shown). For example, the NLU DB training module 322 may include artificial intelligence so as to accurately derive the context, meaning, or the like from the natural language input. As interactions between the master chatbot 302 and the electronic device 303 accumulate, the NLU DB training module 322 may derive the context or meaning of the natural language input more accurately.

According to an embodiment, the DM 323 may manage a natural language dialog between the electronic device 303 and the master chatbot 302 and may determine an operation to be performed by the master chatbot 302. For example, the DM 323 may manage the CP chatbots 311 to 317 in a chat room based on a natural language dialog (e.g., the DM 323 may invite one or more CP chatbots to a chat room or exclude one or more CP chatbots from the chat room). The messenger plug-in 324 may allow the master chatbot 302 to interact with various types of messenger applications 331 to 337 installed in the electronic device 303. The messenger plug-in 324 may manage the input/output of messages exchanged with the messenger applications 331 to 337. When doing so, the messenger plug-in 324 may format messages from the DM 323 into formats suitable for each of the messenger applications.

According to an embodiment, various types of the messenger applications 331 to 337 may be installed in the electronic device 303. The messenger applications may include various third party applications, such as Skype™, Telegram™, Wechat™, Facebook Messenger™, and the like.

Figure 4:
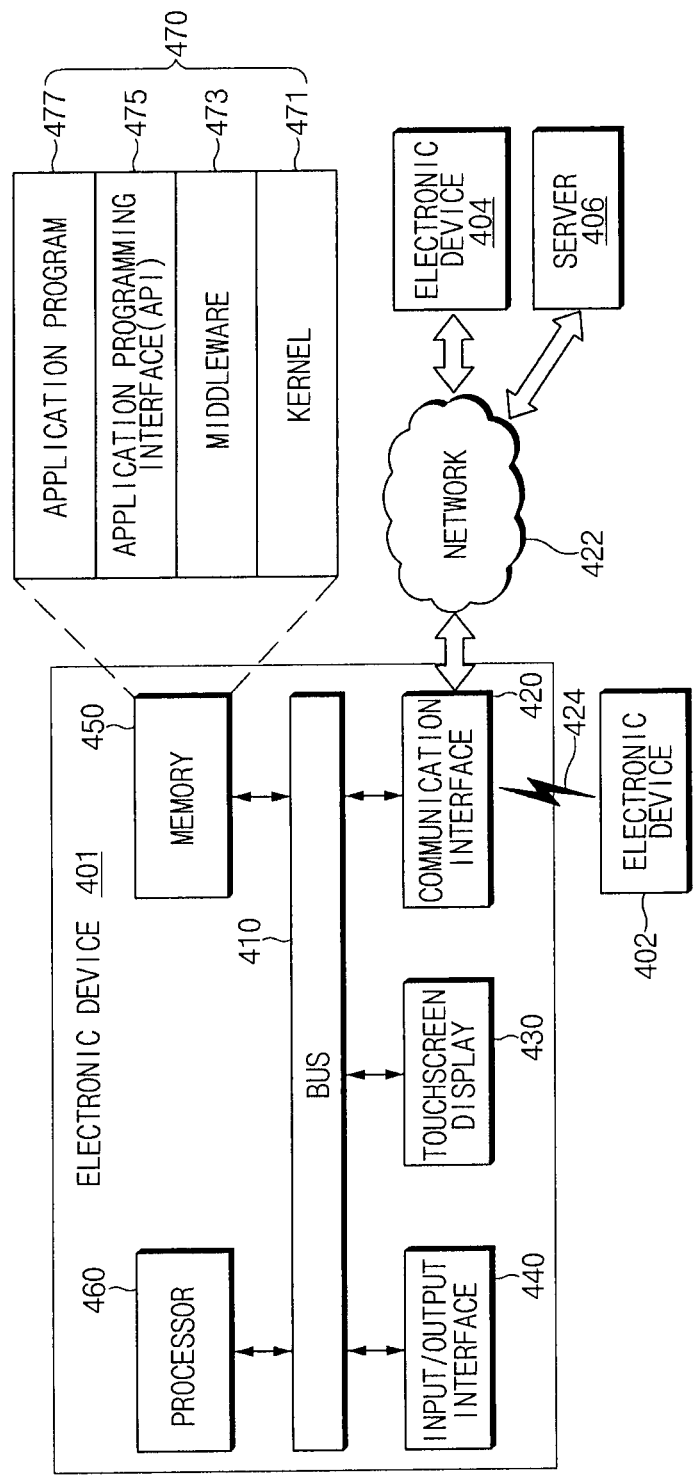
FIG. 4 is a block diagram illustrating an electronic device in a network environment, according to an embodiment.

FIG. 4 is a block diagram illustrating an electronic device in a network environment, according to an embodiment.

Referring to FIG. 4, an electronic device 401 may include a bus 410, a communication circuit 420, a touchscreen display 430, an input/output interface 440, a memory 450, and a processor 460. In any embodiment, the electronic device 401 may not include at least one of the above-described elements or may further include any other element(s). For example, the electronic device 401 of FIG. 4 may correspond to the electronic device 10 illustrated in FIG. 1.

For example, the bus 410 may interconnect the above-described elements 420 to 460 and may include a circuit for conveying communications (e.g., a control message and/or data) among the above-described elements.

For example, the communication circuit 420 may establish communication with an electronic device 402 or 404 and a server 406. For example, the server 406 may include the ASR server 20, the messenger server 30, and/or a plurality of NLP servers 41 to 45 illustrated in FIG. 1.

According to an embodiment, the communication circuit 420 may be connected to a network 422 through wireless communication or wired communication so as to communicate with the electronic device 404 and/or the server 406.

The wireless communication may include cellular communication using at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the wireless communication may include, for example, at least one of wireless fidelity (Wi-Fi), radio frequency (RF), body area network (BAN), or GNSS. The GNSS may include at least one of, for example, a global positioning system (GPS), a global navigation satellite system (Glonass), a Beidou Navigation Satellite System, or a European global satellite-based navigation system (Galileo), depending on a use (or service) area, a bandwidth, or the like.

The wired communication may include at least one of, for example, a universal serial bus (USB), a high definition multimedia interface (HDMI), a recommended standard-232 (RS-232), a plain old telephone service (POTS), or the like. The network 422 may include at least one of telecommunications networks such as a computer network (e.g., LAN or WAN), an Internet, or a telephone network.

According to an embodiment, the communication circuit 420 may communicate with the electronic device 402 through short range communication 424 (e.g., a device to device connection). For example, the short range communication 424 may include Wi-Fi Direct, Bluetooth, Bluetooth low energy (BLE), Zigbee, near field communication (NFC), or magnetic stripe transmission or magnetic secure transmission (MST).

The touchscreen display 430 may include, for example, a liquid crystal display (LCD), a light-emitting diode (LED) display, an organic LED (OLED) display, a microelectromechanical systems (MEMS) display, or an electronic paper display. The touchscreen display 430 may display, for example, various kinds of content (e.g., a text, an image, a video, an icon, and/or a symbol) and a UI to a user. The touchscreen display 430 may receive, for example, a touch, gesture, proximity, or hovering input using an electronic pen or a portion of the user's body.

The I/O interface 440 may transmit an instruction or data, input from the user or another external device, to other element(s) of the electronic device 401. Furthermore, the I/O interface 440 may output an instruction or data, received from other element(s) of the electronic device 401, to the user or another external device. According to an embodiment, a microphone that converts the utterance of the user into an audio signal may be connected to the electronic device 401 through the input/output interface 440 or may be embedded in the electronic device 401.

The memory 450 may include a volatile and/or nonvolatile memory. For example, the memory 450 may store instructions or data associated with at least one other element(s) of the electronic device 401. According to an embodiment, the memory 450 may store software and/or a program 470.

The program 470 may include, for example, a kernel 471, a middleware 473, an application programming interface (API) 475, and/or an application program (or an "application") 477. At least a part of the kernel 471, the middleware 473, or the API 475 may be referred to as an "operating system (OS)."

The kernel 471 may control or manage system resources (e.g., the bus 410, the processor 460, the memory 450, and the like) that are used to execute operations or functions of other programs (e.g., the middleware 473, the API 475, and the application program 477). Furthermore, the kernel 471 may provide an interface that allows the middleware 473, the API 475, or the application program 477 to access respective elements of the electronic device 401 so as to control or manage system resources.

The middleware 473 may perform, for example, a mediation role such that the API 475 or the application program 477 communicates with the kernel 471 to exchange data. Furthermore, the middleware 473 may process one or more task requests received from the application program 477 according to a priority. For example, the middleware 473 may assign the priority, which makes it possible to use a system resource (e.g., the bus 410, the processor 460, the memory 450, or the like) of the electronic device 401, to at least one of the application programs 477. For example, the middleware 473 may process the one or more task requests according to the priority assigned to the at least one, which makes it possible to perform scheduling or load balancing on the one or more task requests.

The API 475 may be an interface through which the application program 477 controls a function provided by the kernel 471 or the middleware 473, and may include, for example, at least one interface or function (e.g., an instruction) for a file control, a window control, image processing, a character control, or the like.

According to an embodiment, the memory 450 may store a messaging application program including a messaging UI. In addition, for example, the memory 450 may store instructions that, when executed, cause the processor 460 to perform various operations described in the present disclosure.

The processor 460 may include one or more of a central processing unit (CPU), an application processor (AP), or a communication processor (CP). For example, the processor 460 may be electrically connected to the other elements 410 to 450 included in the electronic device 401 so as to execute operations or data processing associated with control and/or communication of the other elements. The processor 460 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 460 may display the messaging UI (e.g., a chat room UI or the like) on the touchscreen display 430 in response to the launching of the messaging application program.

According to an embodiment, the processor 460 may receive a first natural language input from the user. For example, the first natural language input may be received through the touchscreen display 430 via a virtual keyboard. That is, the first natural language input be text that the user directly enters. For another example, the first natural language input may be speech that is captured as an audio signal by the microphone. For example, the processor 460 may transmit the audio signal to an ASR server through the communication circuit 420 and may receive corresponding text data from the ASR server in response. The text data may then serve as the first natural language input.

If the first natural language input is received, the processor 460 may display, on the messaging UI, a first indication (e.g., 13-1 of FIG. 1) indicating the user and a first message (e.g., 13-2 of FIG. 1) based at least partly on the first natural language input. In the case where the first natural language input was a voice input, at least part of the first message may include the result of the speech recognition of the voice input. The first indication may be displayed adjacent to the first message. The first indication may include text, image, and/or video for identifying the user, and likewise, the second indication and the third indication that are described below may similarly include text, image, and/or video.

According to an embodiment, if the first natural language input is received, the processor 460 may transmit at least part of the first natural language input to NLP servers by using the communication circuit 420 and may receive a first response from a first NLP through the communication circuit 420.

According to an embodiment, the first response may be generated by the first NLP server based on at least part of the first natural language input. The first response may be generated based on a first context derived from the first natural language input and may include content associated with a service that the first NLP server provides.

The first context may correspond to the content associated with the service that the first NLP server provides. For example, in the case where the first NLP server corresponds to a travel service, the first context may include natural language of names of various tourist sites, names of buildings (e.g., Eiffel Tower), transportation, dates, and the like.

The first NLP server may include a first NLU module (including a first NLU engine and a first NLU pool) corresponding to a first domain. The first response may be generated by using the first NLU engine and the first NLU pool of the first domain. For example, the first NLP server (or the first NLU engine) may use the natural languages included in the first NLU pool according to natural language algorithms so as to generate the first response.

According to an embodiment, if the first response is received, the processor 460 may display, on the messaging UI, a second indication (e.g., 14-1 of FIG. 1) indicating the first NLP server and a second message (e.g., 14-2 of FIG. 1) based on at least part of the first response. The second message may include content that is associated with the service provided by the first NLP server. The second indication may be displayed adjacent to the second message.

According to an embodiment, the processor 460 may receive a second response from a second NLP server through the communication circuit 420.

The second response may be generated by the second NLP server based on at least part of the first natural language input. The second response may be generated based on a second context derived from the first natural language input. The second context may correspond to a second domain. The second context may include content associated with a service that the second NLP server provides.

For example, in the case where the second NLP server corresponds to flight reservation content or flight reservation service, the second context may include natural language of such things as names of airports, names of areas where airports are located, flight numbers, departure/arrival dates, and the like.

The second NLP server may include a second NLU module (including a second NLU engine and a second NLU pool) corresponding to the second domain. The second response may be generated by using the second NLU engine and the second NLU pool of the second domain. For example, the second NLP server (or the second NLU engine) may use the natural languages included in the second NLU pool according to natural language algorithms so as to generate the second response.

According to an embodiment, if the second response is received, the processor 460 may display, on the messaging UI, a third indication (e.g., 15-1 of FIG. 1) indicating the second NLP server and a third message (e.g., 15-2 of FIG. 1) based at least partly on the second response. The third message may include content that is associated with the service provided by the second NLP server. The third indication may be displayed adjacent to the third message.

According to the above-described embodiment, the NLP servers may generate different responses based on different contexts in response to the same natural language input of the user. These different responses may be displayed as different messages in the messaging UI.

Meanwhile, the processor 460 of the electronic device 401 may perform the following operation in addition to the above-described operation. The series of operations described below are independent of the above-described operations.

According to an embodiment, the processor 460 may display a messaging UI in the touchscreen display 430 in response to the launching of a messaging application program.

According to an embodiment, the processor 460 may receive a first natural language input from the user. For example, the first natural language input may be received through the touchscreen display 430 via a virtual keyboard. For another example, the first natural language input may be speech that is captured as an audio signal by the microphone. For example, the processor 460 may transmit the audio signal to an ASR server through the communication circuit 420 and may receive corresponding text data from the ASR server in response. The text data may then serve as the first natural language input.

If the first natural language input is received, the processor 460 may display, on the messaging UI, a first indication indicating the user and a first message based at least partly on the first natural language input. The first indication may be displayed adjacent to the first message.

According to an embodiment, if the first natural language input is received, the processor 460 may transmit at least part of the first natural language input to NLP servers by using the communication circuit 420 and may receive a first response from the NLP servers through the communication circuit 420.

According to an embodiment, the first response may be generated by the first NLP server in response to at least part of the first natural language input. But there may be case where the first natural language input may not be relevant to the service provided by the first NLP server. In this case, the first NLP server may fail to provide the proper content or service for the first natural language input. When this happens, the first response generated by the first NLP server may indicate a second NLP server capable of generating a proper response for the first natural language input.

For example, the first NLP server may provide movie booking content or a movie booking service, and the first natural language input may be related to flight reservation booking. In this case, the first NLP server may generate the first response which indicates another NLP server capable of providing flight reservation content or flight reservation service. As a result, the first response may be received in the case where the first NLP server is not associated with the context derived from the first natural language input or the domain corresponding to the first natural language input.

According to an embodiment, if the first response is received, the processor 460 may display, on the messaging UI, the second indication indicating the first NLP server and the second message based at least partly on the first response. The second indication may be displayed adjacent to the second message. For example, the second message may include a list of other NLP servers.

According to an embodiment, the processor 460 may receive a second natural language input from the user. The second natural language input may include a selection of at least one NLP server listed in the second message.

If the second natural language input is received, the processor 460 may display, on the messaging UI, a first indication indicating the user and a third message based at least partly on the second natural language input. The first indication may be displayed adjacent to the third message.

If the second natural language input is received, the processor 460 may transmit at least part of the second natural language input to NLP servers by using the communication circuit 420. The selected NLP server (hereinafter may be referred to as the second NLP server) may generate a second response different from the first response, and the second response may be received by the processor 460 through the communication circuit 420.

According to an embodiment, the second response may be generated by the second NLP server in response to at least part of the first natural language input. The second NLP server may receive the first natural language input from the electronic device 401 or the first NLP server for the purpose of generating the second response.

For example, the second response may be generated based on a second context derived from the first natural language input and may include content associated with a service that the second NLP server provides.

The second context derived from the first natural language input may correspond to the service that the second NLP server provides. In addition, the second response may be composed by using the second NLU pool, which corresponds to the second context and is included in the second NLP server. For example, the second NLP server may use the natural languages included in the second NLU pool according to natural language algorithms so as to generate the second response.

According to an embodiment, if the second response is received, the processor 460 may display, on the messaging UI, a third indication indicating the second NLP server and the fourth message based at least partly on the second response. The third indication may be displayed adjacent to the fourth message.

According to the above-described embodiment, in the case where the first NLP server fails to generate a proper response in response to the first natural language input of the user, the first NLP server may recommend at least one other NLP server, including a second NLP server. In the case where the user enters the second natural language input to select the second NLP server, the electronic device 401 may receive the proper response corresponding to the first natural language input from the selected second NLP server.

The present disclosure is not limited to the above-described exemplary operations of the processor 460. Processor operations described in other parts of this specification may also be performed by the processor 460. Also, in this specification, at least some of operations described as operations of an "electronic device" should be understood as operations of the processor 460.

Figure 5:
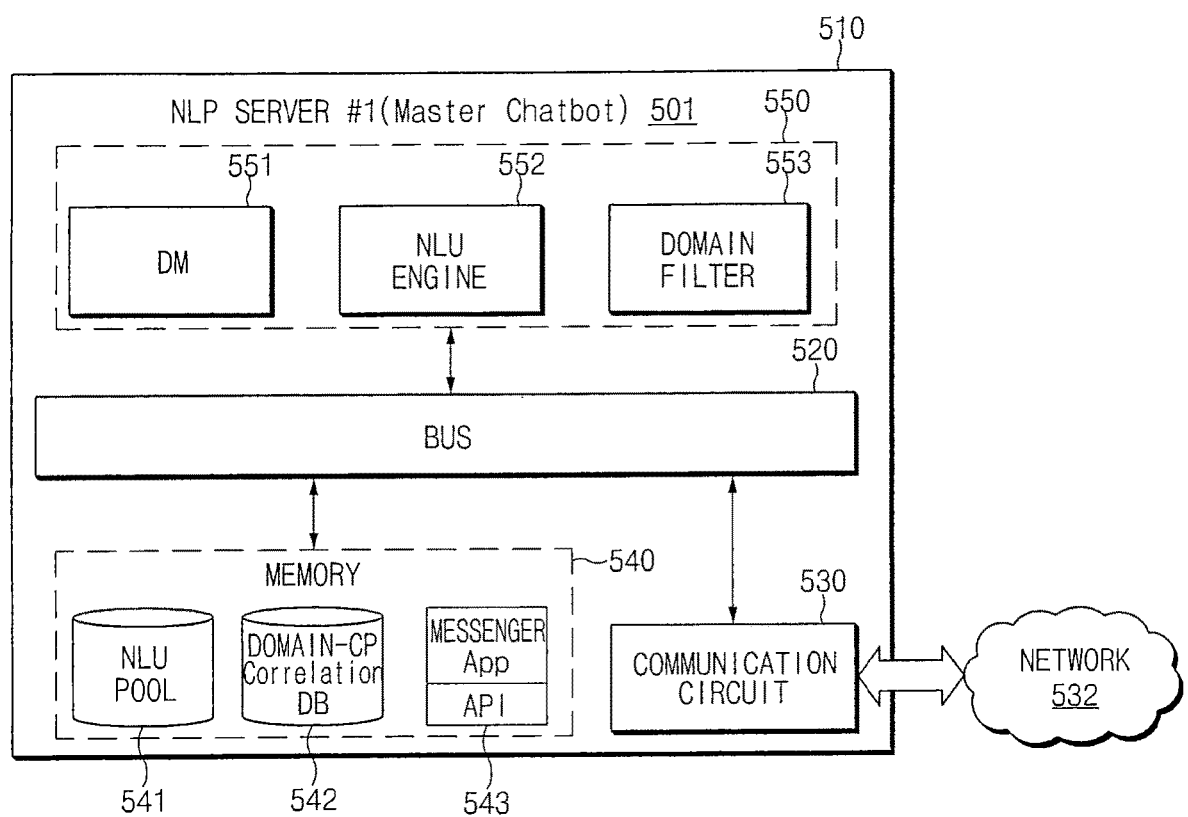
FIG. 5 is a block diagram illustrating a first NLP server (master chatbot), according to an embodiment.

FIG. 5 is a block diagram illustrating a first NLP server (master chatbot), according to an embodiment.

Referring to FIG. 5, a first NLP server (master chatbot) 501 may include a housing 510, a communication circuit 530, a memory 540, and a processor 550. In other embodiments, the NLP server 501 may omit one or more of the aforementioned elements or may further include additional elements. The NLP server 501 may correspond to, for example, the first NLP server 41 illustrated in FIG. 1.

The housing 510 may contain each of the elements 520 to 550 included in the first NLP server 501. The housing 510 may protect the elements 520 to 550 included in the NLP server 501 from dust and external shocks.

The bus 520 may interconnect the above-described elements 530 to 550 and may include a circuit for relaying communications (e.g., control messages and/or data) between the above-described elements.

The communication circuit 530 may establish communication between the NLP server 501 and an external device (e.g., an electronic device, a messenger server, CP chatbots, or the like). For example, the communication circuit 530 may be connected to a network 532 through wireless communication or wired communication.

The memory 540 may include a volatile and/or nonvolatile memory. For example, the memory 540 may store instructions or data associated with at least one other element of the first NLP server 501.

According to an embodiment, the memory 540 may include an NLU pool 541, a domain-CP correlation DB 542, and a messaging application 543. The NLU pool 541 may contain the set of natural languages used by the NLP server 501 so that the NLP server 501 can provide content in natural language. The natural languages may be associated with the content associated with the service that the first NLP server 501 provides. The domain-CP correlation DB 542 may include information for matching a CP chatbot to a domain or context of the CP chatbot. The messaging application 543 may be a program for transmitting and receiving messages to or from another electronic device. These messages may be routed through a messenger server. The messaging application 543 may include instructions to be executed by the processor 550, an application programming interface (API) for interacting with an application executed by an external electronic device, and/or a software development kit (SDK).

The processor 550 may include one or more of a central processing unit (CPU), an application processor (AP), or a communication processor (CP). For example, the processor 550 may be electrically connected to the other elements included in the first NLP server 501 so as to execute operations or data processing associated with control and/or communication of the other elements.

According to an embodiment, the processor 550 may include a DM 551, an NLU engine 552, and a domain filter 553. Each of the DM 551, the NLU engine 552, and the domain filter 553 may be software modules that are executed or processed by the processor 550. Accordingly, it is understood that the operations of the DM 551, the NLU engine 552, and the domain filter 553 correspond to the operations of the processor 550. In this specification, the combination of the NLU engine 552 and the NLU pool 541 may be referred to as an "NLU module."

According to an embodiment, the DM 551 may manage messages (or dialogs) that are transmitted or received by the messaging application 543. Under the support of the NLU engine 552, the DM 551 may receive a natural language input message from an electronic device and may generate a response to the electronic device responsive to the natural language input message. According to an embodiment, the DM 551 may invite a CP chatbot (NLP server) selected by the domain filter 553 to send a message to the user or may exclude a CP chatbot (NLP server) that the user designates.

According to an embodiment, the NLU engine 552 may derive context from the natural language input received from the electronic device, by using the NLU pool 541. The NLU engine 552 may also generate a natural language response that is transmitted to the electronic device.

According to an embodiment, the domain filter 553 may select the CP chatbot (NLP server) corresponding to the context derived from natural language input. The domain filter 553 may accomplish this by referencing the domain-CP correlation DB 542. For example, in the case where the natural language input received from the electronic device includes context associated with a coffee order, the domain filter 553 may refer to the domain-CP correlation DB 542 to select the CP chatbot of cafe A (the NLP server operated by cafe A). According to an embodiment, the domain filter 553 may transmit the natural language input to a plurality of CP chatbots and may receive response messages and associated confidence levels from each of the plurality of CP chatbots. The domain filter 553 may then select the appropriate CP chatbot by comparing the confidence levels.

Figure 6:
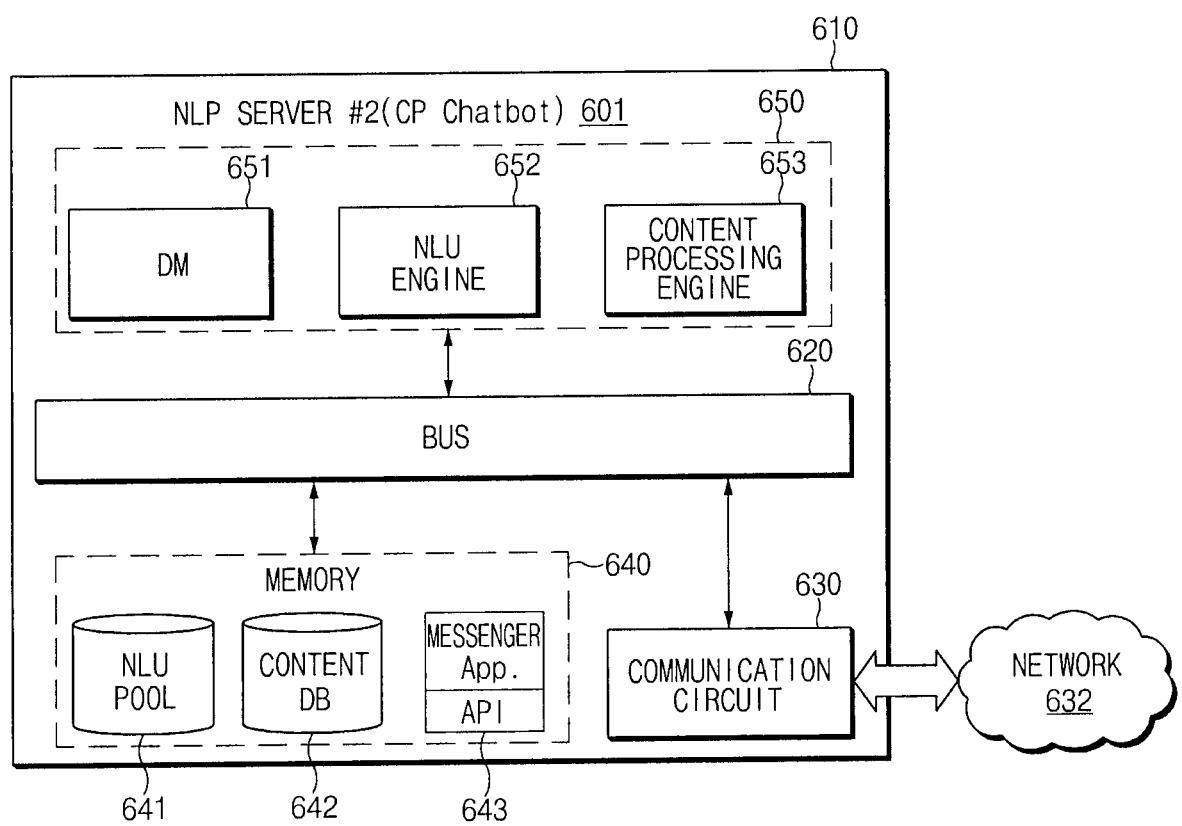
FIG. 6 is a block diagram illustrating a second NLP server (CP chatbot), according to an embodiment.

FIG. 6 is a block diagram illustrating a second NLP server (CP chatbot), according to an embodiment.

Referring to FIG. 6, a second NLP server 601 (CP chatbot) may include a housing 610, a communication circuit 630, a memory 640, and a processor 650. In other embodiments, the NLP server 601 may omit one or more of the aforementioned elements or may further include additional elements. For example, the NLP server 601 may correspond to the NLP servers (CP chatbots) 42, 43, 44, and 45 illustrated in FIG. 1.

The housing 610 may contain each of the elements 620 to 650 included in the second NLP server 601.

The bus 620 may interconnect the above-described elements 630 to 650 and may include a circuit for relaying communications (e.g., control messages and/or data) between the above-described elements.

The communication circuit 630 may be connected to a network 632 through wireless communication or wired communication so as to communicate with an external device (e.g., an electronic device, a messenger server, other NLP servers, or the like).

The memory 640 may store instructions or data associated with at least one other element(s) of the second NLP server 601.

According to an embodiment, the memory 640 may include an NLU pool 641, a content DB 642, and a messaging application 643. The NLU pool 641 may contain the set of natural languages used by the second NLP server 601 so that the NLP 601 can provide content in natural language. The natural languages may be associated with the content associated with the service that the first NLP server 601 provides. The content DB 642 may include various pieces of information, data, or the like that may be provided by the NLP server 601 in response to a natural language input. The messaging application 643 may be a program for transmitting and receiving messages to or from another external device. These messages may be routed through a messenger server. The messaging application 643 may include an API or an SDK for allowing an application executed by an external electronic device to interact with the messaging application 643.

The processor 650 may include one or more of a central processing unit (CPU), an application processor (AP), or a communication processor (CP). For example, the processor 650 may be electrically connected to the other elements included in the second NLP server 601 so as to execute operations or data processing associated with control and/or communication of the other elements.

According to an embodiment, the processor 650 may include a DM 651, an NLU engine 652, and a content processing engine 653. Each of the DM 651, the NLU engine 652, and the content processing engine 653 may be software modules that are executed or processed by the processor 650. Accordingly, it is understood that the operations of the DM 651, the NLU engine 652, and the content processing engine 653 correspond to the operations of the processor 650. In this specification, the combination of the NLU engine 652 and the NLU pool 641 may be referred to as an "NLU module."

According to an embodiment, the DM 651 may manage messages (or dialogs) that are transmitted or received by the messaging application 643. Under the support of the NLU engine 652, the DM 651 may receive a natural language input message from an electronic device and may generate a response message to the electronic device.

According to an embodiment, the NLU engine 652 may derive context from the natural language input received from the electronic device, by using the NLU pool 641. The NLU engine 652 may also generate a natural language response that is transmitted to the electronic device. For example, if first context derived from the natural language input corresponds to the content provided by the content processing engine 653, the NLU engine 652 may generate the first response by using the first context, the NLU pool 641, and the information or data included in the content DB 642. Afterwards, the NLU engine 652 may transmit the first response to the electronic device through the communication circuit 630.

According to an embodiment, the NLU engine 652 may fail to derive the first context from the natural language input. If the first context is not derived, the second NLP server 601 may not provide the proper content. Accordingly, the NLU engine 652 of the second NLP server 601 may determine whether the second context of a second domain associated with the content that another NLP server provides is derived from the natural language input. If the second context of the second domain is derived, the NLU engine 652 may generate the second response indicating other NLP server(s) (a server including the second NLU pool corresponding to the second domain) belonging to the second domain and may transmit the second response to the electronic device by using the communication circuit 630. The other NLP server(s) may generate a proper response based on the second NLU pool of the second domain corresponding to the second context and may transmit the generated response to the electronic device.

Figure 7:
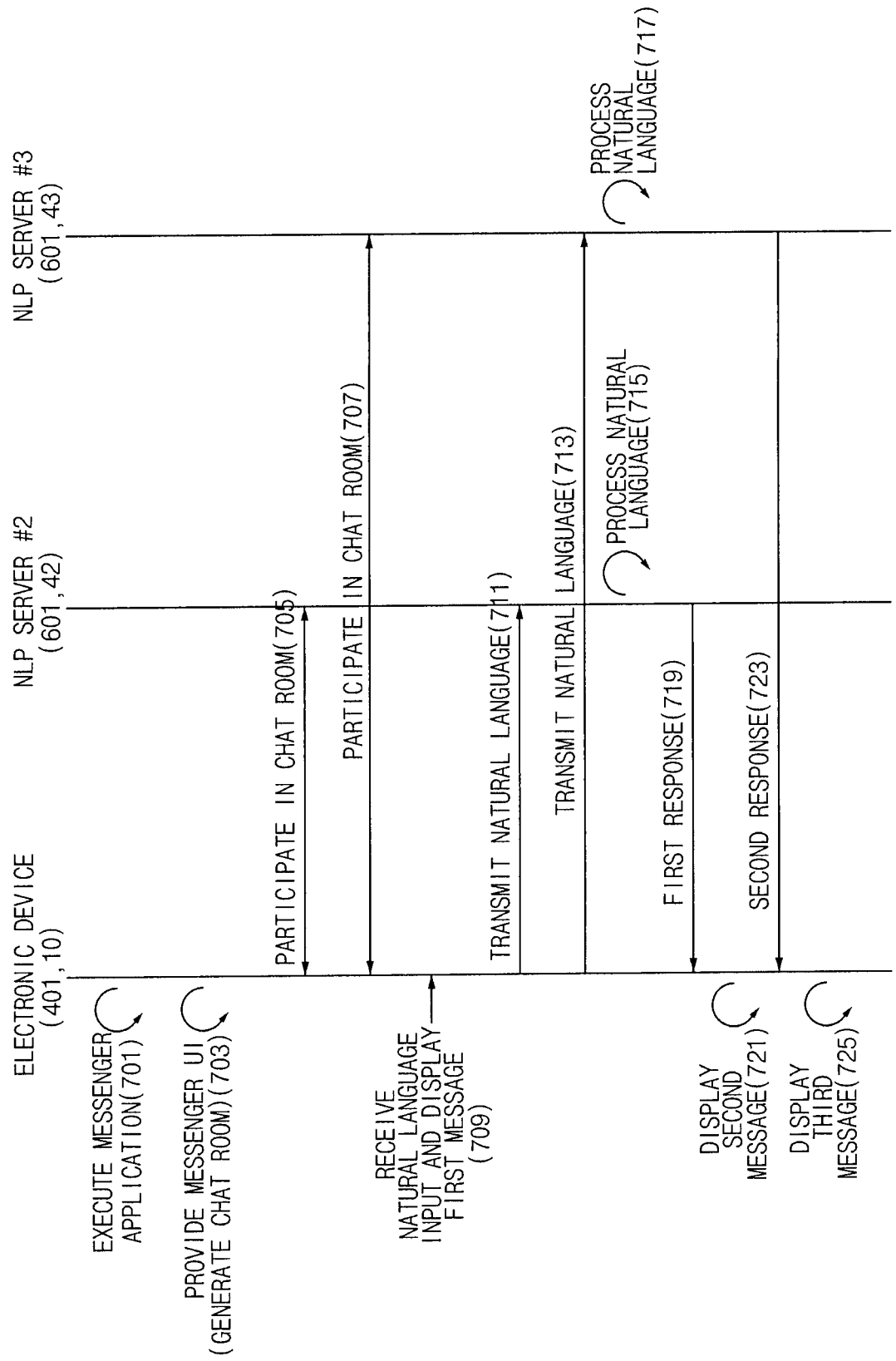
FIG. 7 is a sequence diagram illustrating a content providing method based on natural language understanding, according to an embodiment.
Figure 9:
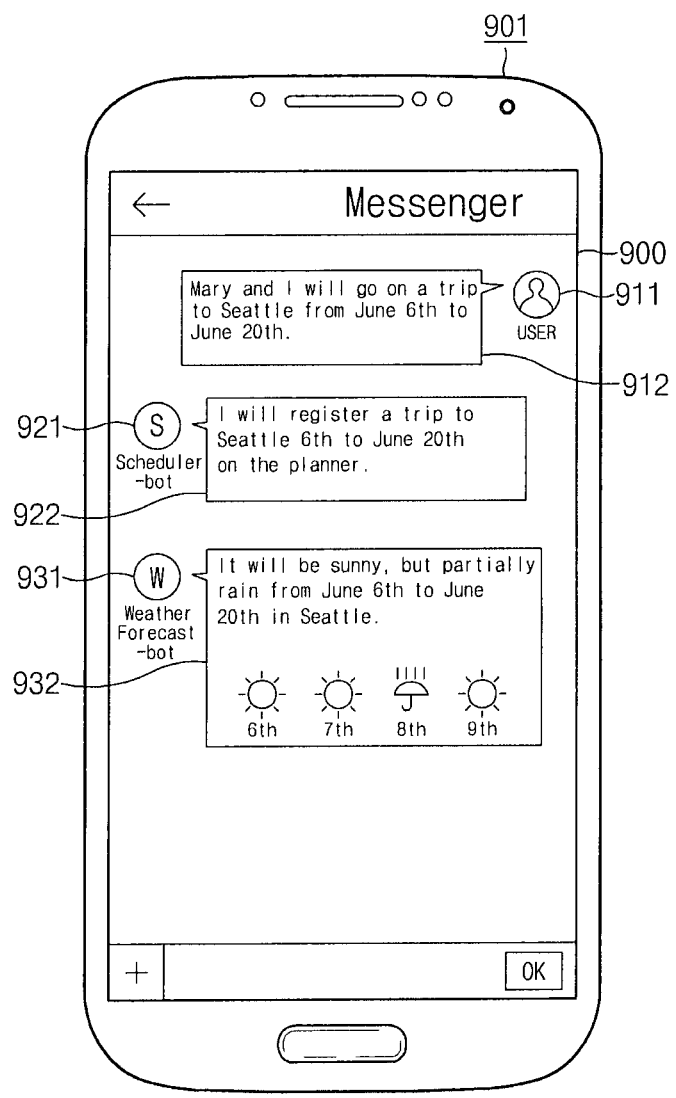
FIG. 9 is a view illustrating an electronic device performing a content providing method, according to an embodiment.

FIG. 7 is a sequence diagram illustrating a content providing method based on natural language understanding, according to an embodiment. FIG. 9 is a view illustrating an electronic device performing a content providing method, according to an embodiment.

Referring to FIG. 7, the content providing method according to an embodiment may include operation 701 to operation 725. For example, operation 701 to operation 725 may be performed by the electronic device 10, the second NLP server (CP chatbot) 42, and the third NLP server (CP chatbot) 43 that are illustrated in FIG. 1. As such, operation 701 to operation 725 may be implemented with instructions that are capable of being performed or executed by the devices 10, 42, and 43. The configuration of the electronic device 10 may correspond to the electronic device 401 of FIG. 4. The configuration of each of the second NLP server 42 and the third NLP server 43 may correspond to the configuration of the second NLP server 601 illustrated in FIG. 6. For ease of description, an exemplary user interface generated by operations 701 to 725 are shown in FIG. 9, which will be described together with FIG. 7.

In operation 701, the electronic device 10 may launch or execute a messaging application.

In operation 703, the electronic device 10 may display a messaging UI (e.g., a chat room UI or the like) on a touchscreen display of the electronic device 10 in response to the launching of the messaging application program.

In operation 705 and operation 707, the second NLP server 42 and the third NLP server 43 may participate in a chat room with the user of the electronic device 10. In the chat room UI displayed in the touchscreen display of the electronic device 10, the second NLP server 42 and the third NLP server 43 may be shown as independent entities that can converse with the user.

In operation 709, the electronic device 10 may receive a natural language input from the user. For example, the natural language input may be received through a virtual keyboard displayed on the touchscreen display or may be received through a microphone. If the natural language input is received, the electronic device 10 may display, in the chat room UI, a first indication indicating the user and a first message based at least partly on the natural language input.

For example, referring to FIG. 9, if an electronic device 901 receives a natural language input saying that "Mary and I will go on a trip to Seattle from June 6th to June 20th," the electronic device 901 may display a first indication 911 indicating the user of the electronic device 901 and a first message 912 based on the natural language input.

In operation 711 and operation 713, the electronic device 10 may transmit the natural language input received in operation 709 to the second NLP server 42 and the third NLP server 43.

In operation 715, if the natural language input is received, the second NLP server 42 may process the natural language input to generate a first response. The first response may be generated based on first context derived from the natural language input and may include content associated with the service provided by the second NLP server 42. The second NLP server 42 may use the natural languages included in its NLU pool according to natural language algorithms so as to generate a natural language first response responsive to the natural language input.

In operation 717, if the natural language input is received, the third NLP server 43 may process the natural language input to generate a second response. The second response may be generated based on second context derived from the natural language input and may include content associated with the service provided by the third NLP server 43. The third NLP server 43 may use the natural languages included in its NLU pool according to natural language algorithms so as to generate a natural language second response responsive to the natural language input.

In operation 719, the second NLP server 42 may transmit the first response to the electronic device 10.

In operation 721, if the electronic device 10 receives the first response from the second NLP server 42, the electronic device 10 may display, on the chat room UI, a second indication indicating the second NLP server 42 and a second message based at least partly on the first response.

For example, referring to FIG. 9, if the electronic device 901 receives the first response saying that "I will register a trip to Seattle from June 6th to June 20th on the planner," the electronic device 901 may display a second indication 921 indicating the second NLP server (Scheduler-bot) 42 and a second message 922 based on the first response. The electronic device 901 may process the second message 922 and register the Seattle trip from June 6th to June 20th by using a planner application.

In operation 723, the third NLP server 43 may transmit the second response to the electronic device 10.

In operation 725, if the electronic device 10 receives the second response from the third NLP server 43, the electronic device 10 may display, on the chat room UI, a third indication indicating the third NLP server 43 and a third message based at least partly on the second response.

For example, referring to FIG. 9, if the electronic device 901 receives the second response saying that "It will be sunny, but partially rain from June 6th to June 20th in Seattle," the electronic device 901 may display a third indication 931 indicating the third NLP server (Weather Forecast-bot) 43 and a third message 932 based on the second response. For example, Seattle weather from June 6th to June 20th may be illustrated as images in the third message 932.

Figure 8:
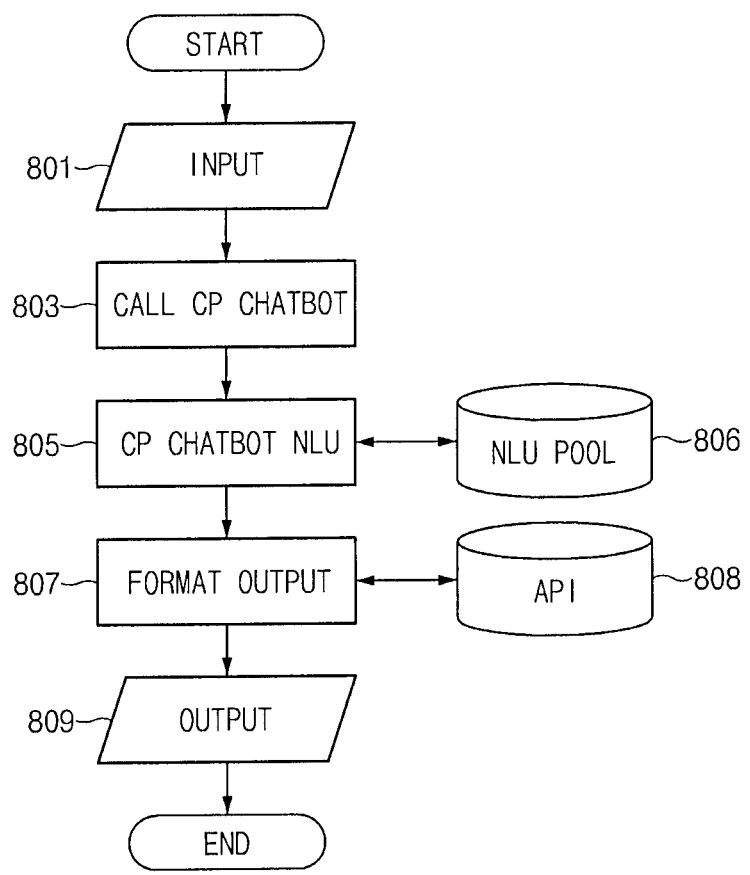
FIG. 8 is a flowchart illustrating a content providing method based on natural language understanding, according to an embodiment.

FIG. 8 is a flowchart illustrating a content providing method based on natural language understanding, according to an embodiment.

Referring to FIG. 8, the content providing method according to an embodiment may include operation 801 to operation 809. For ease of explanation, the operations shown in FIG. 8 may described as being performed by the devices shown in FIG. 1.

In operation 801, the electronic device 10 may receive a natural language input from a user through a messaging application.

In operation 803, the electronic device 10 may call at least one CP chatbot based on the natural language input, i.e. the electronic device 10 may transmit the natural language input to the CP chatbot. In the chat room UI shown on a display of the electronic device 10, the called CP chatbot may be shown as an independent entity that can converse with the user. For example, the electronic device 10 may call a specific CP chatbot relevant to the natural language input. In another example, the electronic device 10 may provide a natural language input that instructs the master chatbot 41 to call the specific CP chatbot.

In operation 805, the CP chatbot may derive context and meaning from the natural language input. The CP chatbot may perform the derivation by analyzing the natural language input in reference to an NLU pool 806. The CP chatbot may generate a response message suitable for the derived context and meaning. The response message may also be in natural language format.

In operation 807, the CP chatbot may format the response message generated in operation 805 into a format suitable for the messaging application used by the user. The formatting may be done by using an API 808 of the messaging application.

In operation 809, the CP chatbot may transmit the response message to the electronic device.

Figure 14:
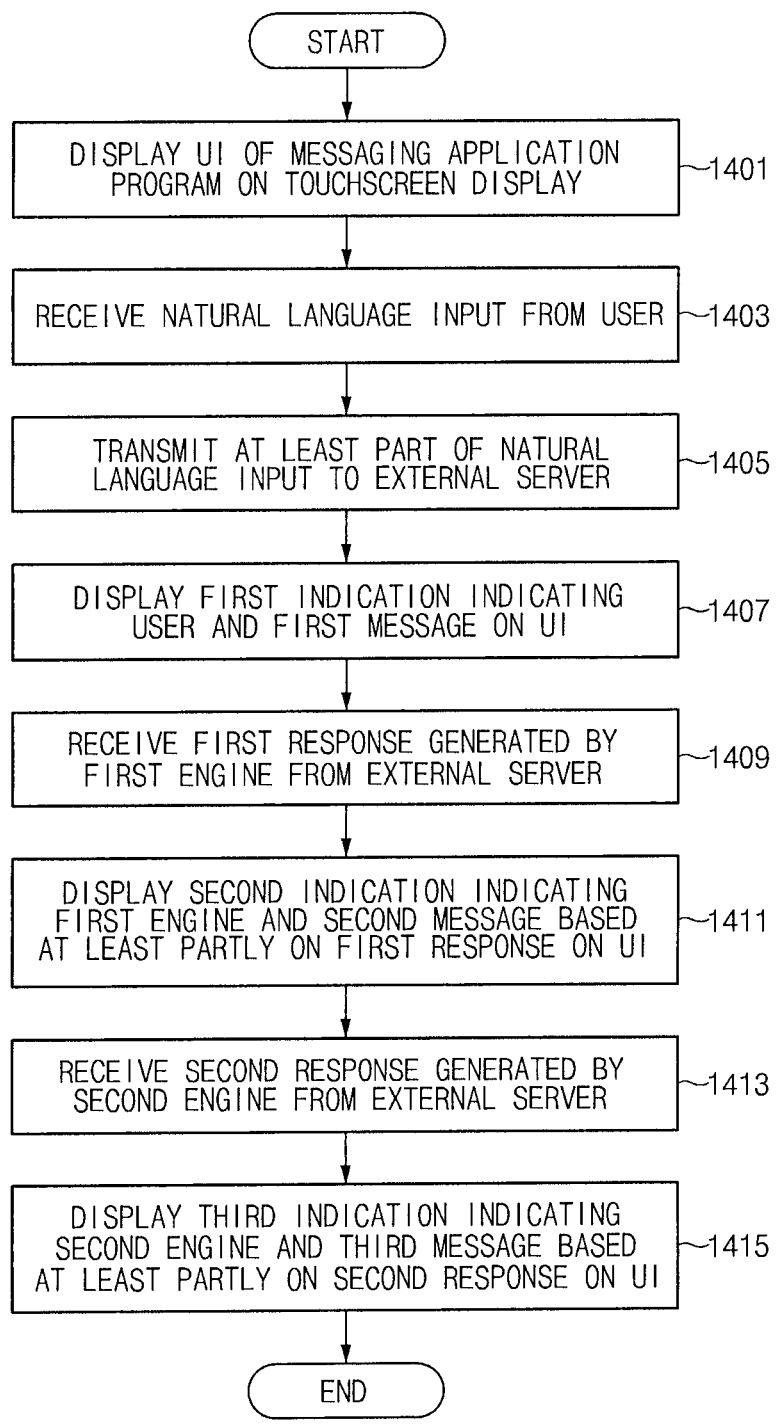
FIG. 14 is a flowchart illustrating an operation of an electronic device, according to an embodiment.

FIG. 14 is a flowchart illustrating an operation of an electronic device, according to an embodiment.

Referring to FIG. 14, an electronic device according to an embodiment may perform operation 1401 to operation 1415. For example, operation 1401 to operation 1415 may be performed by the electronic device 401 or 10 illustrated in FIG. 7.

In operation 1401, the processor of the electronic device may execute a messaging application program so as to display a messaging UI (e.g., a chat room UI) on a touchscreen display of the electronic device.

In operation 1403, the processor of the electronic device may receive a natural language input from the user.

In operation 1405, the processor of the electronic device may transmit at least part of the natural language input to an external server by using a communication circuit.

In operation 1407, the processor of the electronic device may display, on the chat room UI, a first indication indicating the user and a first message based at least partly on the natural language input.

In operation 1409, via the communication circuit, the processor of the electronic device may receive a first response from the external server. The first response may be generated by a first engine (or a first NLP server) in response to at least part of the natural language input.

In operation 1411, the processor of the electronic device may display, on the chat room UI, a second indication indicating the first engine and a second message based at least partly on the first response.

In operation 1413, via the communication circuit, the processor of the electronic device may receive a second response from the external server. The second response may be generated by a second engine (or a second NLP server) in response to at least part of the natural language input.

In operation 1415, the processor of the electronic device may display, on the chat room UI, a third indication indicating the second engine and a third message based at least partly on the second response.

Figure 10:
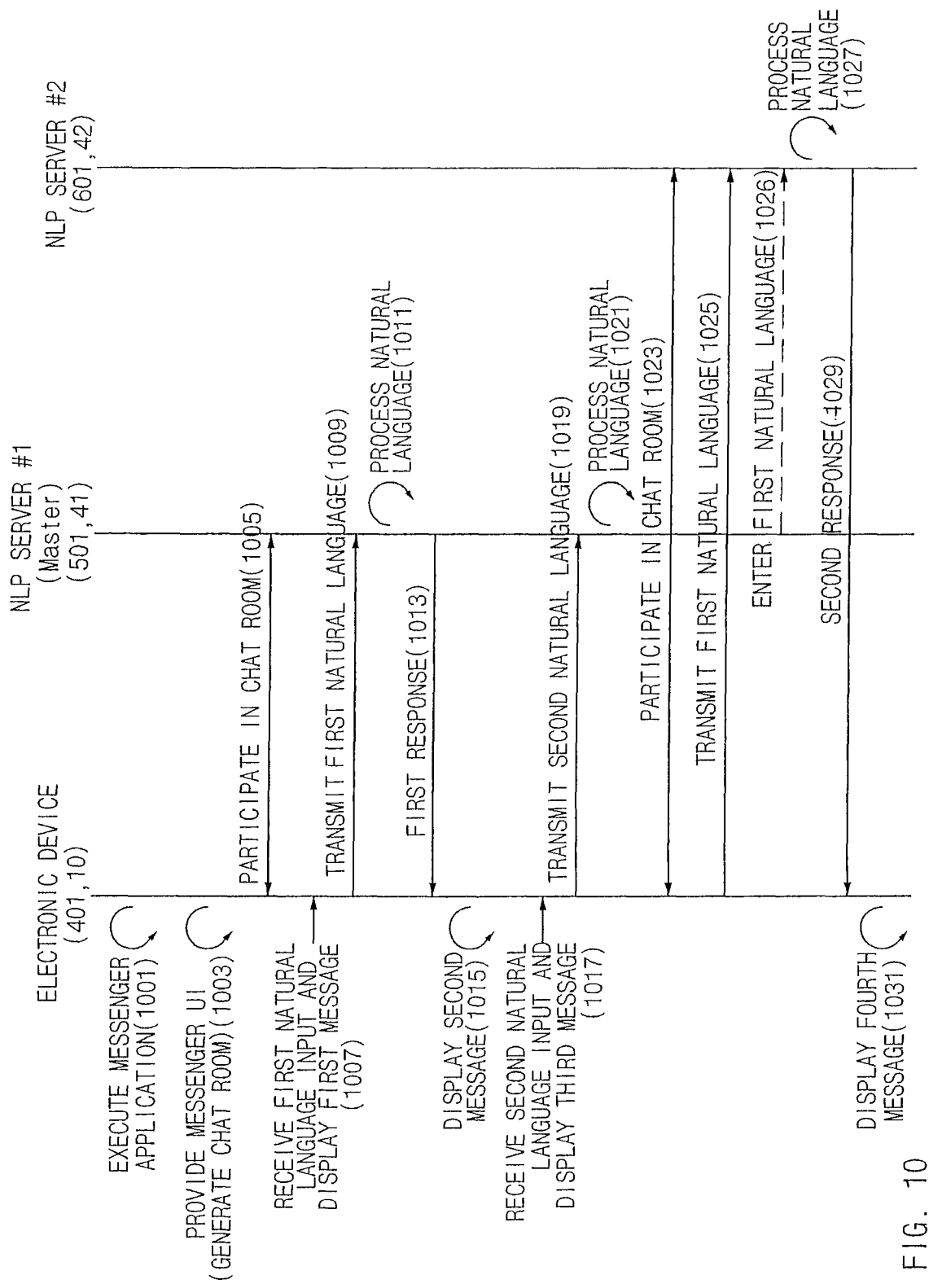
FIG. 10 is a sequence diagram illustrating a content providing method based on natural language understanding, according to an embodiment.
Figure 15A:
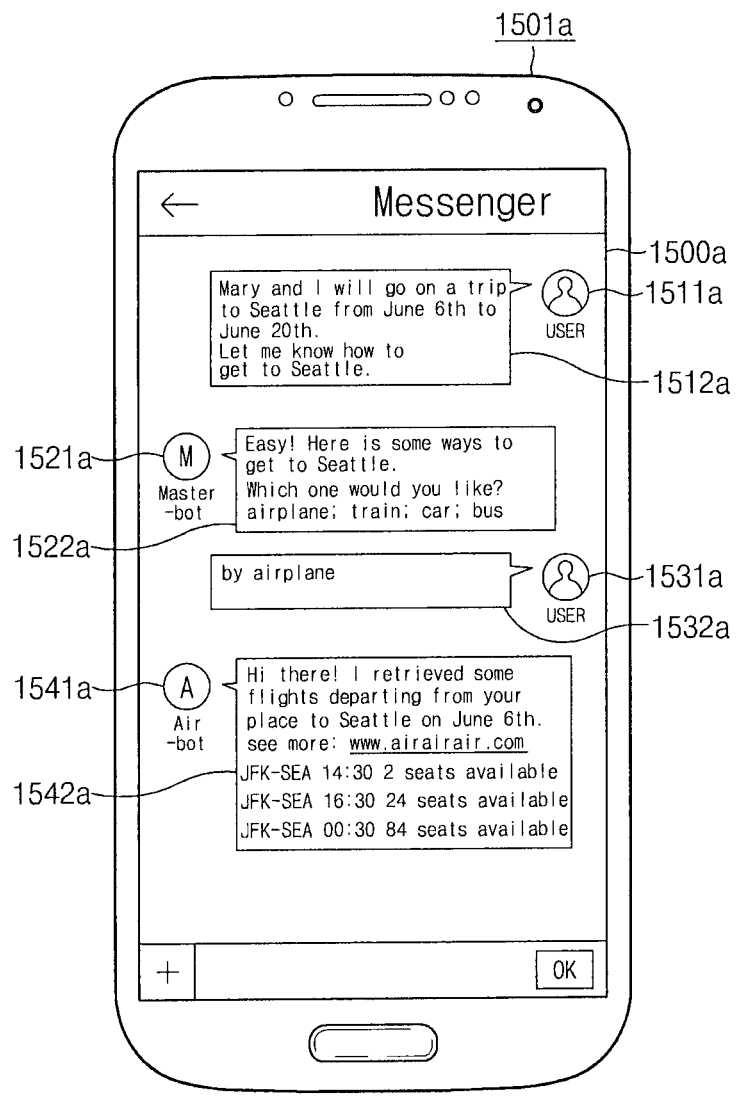
FIG. 15A and FIG. 15B are views illustrating an electronic device performing a content providing method, according to an embodiment.
Figure 15B:
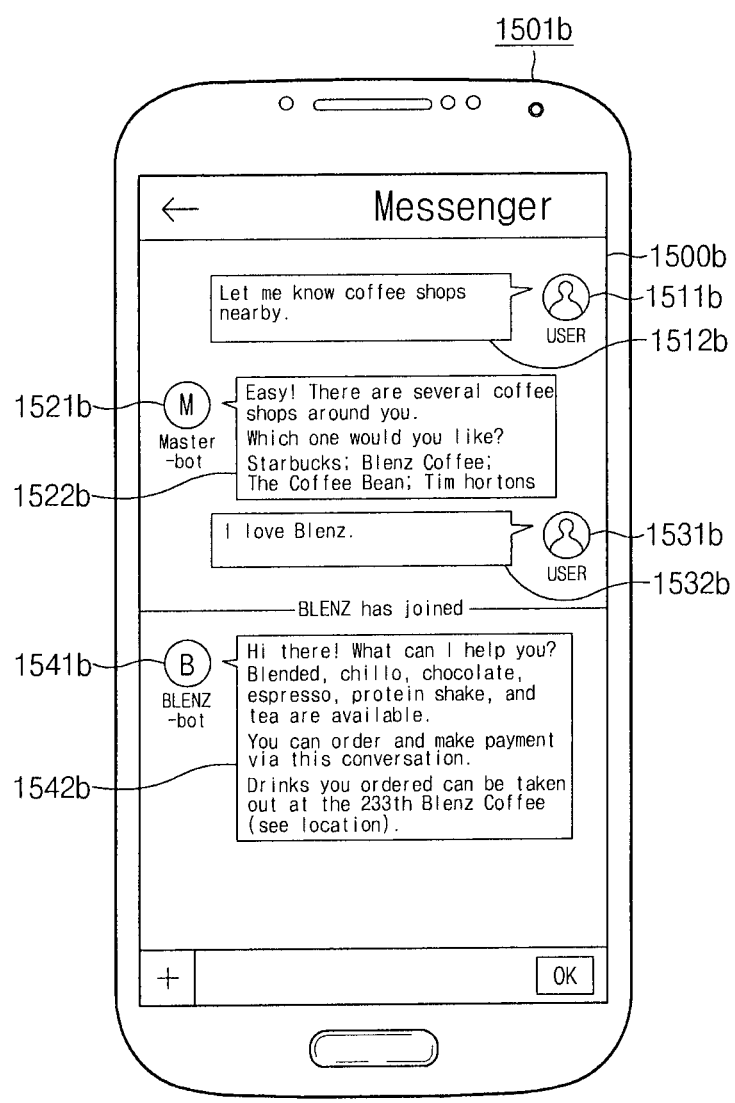

FIG. 10 is a sequence diagram illustrating a content providing method based on natural language understanding, according to an embodiment. FIGS. 15A and 15B are views illustrating an electronic device performing a content providing method according to an embodiment.

Referring to FIG. 10, the content providing method according to an embodiment may include operation 1001 to operation 1031. For example, operation 1001 to operation 1031 may be performed by the electronic device 10, the first NLP server (master chatbot) 41, and the second NLP server (CP chatbot 42), which are illustrated in FIG. 1. As such, operation 1001 to operation 1031 may be implemented with instructions that are capable of being performed or executed by the devices 10, 41, and 42.

Hereinafter, for ease of explanation, operation 1001 to operation 1031 will be described as being performed by the devices shown in FIG. 1. The configuration of the electronic device 10 may correspond to the configuration of the electronic device 401 of FIG. 4. The configuration of the first NLP server 41 may correspond to the configuration of the first NLP server 501 illustrated in FIG. 5. The configuration of the second NLP server 42 may correspond to the configuration of the second NLP server 601 illustrated in FIG. 6. Also for ease of description, exemplary user interfaces generated by operations 1001 to 1031 are shown in FIGS. 15A and 15B, which will be described together with FIG. 10.

In operation 1001, the electronic device 10 may launch or execute a messaging application.

In operation 1003, the electronic device 10 may display a messaging UI on a touchscreen display in response to the launching of the messaging application program. The messaging UI may represent for example, a chat room.

In operation 1005, the first NLP server 41 may participate in the chat room with the user of the electronic device 10. In the messaging UI displayed on the touchscreen display of the electronic device 10, the first NLP server 41 may be displayed as an independent entity capable of conversing with the user.

In operation 1007, the electronic device 10 may receive a first natural language input from the user. If the first natural language input is received, the electronic device 10 may display, on a chat room UI, a first indication indicating the user and a first message based at least partly on the first natural language input.

For example, referring to FIG. 15A, if an electronic device 1501a receives the first natural language input saying that "Mary and I will go on a trip to Seattle from June 6th to June 20th. Let me know how to get to Seattle," the electronic device 1501a may display on the touchscreen display 1500a a first indication 1511a indicating the user of the electronic device 1501a and a first message 1512a based on the first natural language input.

In another example, referring to FIG. 15B, if an electronic device 1501b receives the first natural language input saying that "Let me know coffee shops nearby," the electronic device 1501b may display on the touchscreen display 1500a a first indication 1511b indicating a user of the electronic device 1501b and a first message 1512b based on the first natural language input.

In operation 1009, the electronic device 10 may transmit the first natural language input received in operation 1007 to the first NLP server 41.

In operation 1011, if the first natural language input is received, the first NLP server 41 may process the first natural language input to generate a first response. According to an embodiment, in the first response, the first NLP server 41 may recommend other NLP servers or other CP chatbots. The first NLP server 41 may generate the first response so as to indicate the other NLP servers capable of generating a proper response to the first natural language input.

In operation 1013, the first NLP server 41 may transmit the first response to the electronic device 10.

In operation 1015, if the electronic device 10 receives the first response from the first NLP server 41, the electronic device 10 may display, on the chat room UI, a second indication indicating the first NLP server 41 and a second message based at least partly on the first response.

For example, referring to FIG. 15A, the electronic device 1501a may receive the first response saying that "Easy! Here is some ways to get to Seattle. Which one would you like? airplane; train; car; bus," from the "Master-bot" server (an example of the first NLP server 41). If the electronic device 1501*a* receives the first response, the electronic device 1501*a* may display on the touchscreen display 1500*a* a second indication 1521*a* indicating the "Master-bot" server and a second message 1522*a* based on the first response. A list of the plurality of other NLP servers or CP chatbots (e.g., CP chatbots for airplane, train, car, and bus reservations) may be included in the second message 1522*a*.

In another example, referring to FIG. 15B, the electronic device 1501*b* may receive the first response saying that "Easy! There are several coffee shops around you. Which one would you like? Starbucks; Blenz Coffee; The Coffee Bean; Tim Horton's," from the "Master-bot" server (an example of the first NLP server 41). If the electronic device 1501*b* receives the first response, the electronic device 1501*b* may display on the touchscreen display 1500*a* a second indication 1521*b* indicating the "Master-bot" server and a second message 1522*b* based on the first response. A list of the plurality of other NLP servers or CP chatbots (e.g., CP chatbots for taking orders at Starbucks, Blenz Coffee, The Coffee Bean, and Tim Horton's) may be included in the second message 1522*b*.

In operation 1017, the electronic device 10 may receive a second natural language input indicating the selection of at least one NLP server (the second NLP server 42) included in the list of the second message. If the second natural language input is received, the electronic device 10 may display, on the chat room UI, the first indication indicating the user and a third message based at least partly on the second natural language input.

For example, referring to FIG. 15A, if the electronic device 1501*a* receives the second natural language input saying "by airplane," the electronic device 1501*a* may display a first indication 1531*a* indicating the user of the electronic device 1501*a* and a third message 1532*a* based on the second natural language input.

In another example, referring to FIG. 15B, if an electronic device 1501*b* receives the second natural language input saying "I love Blenz," the electronic device 1501*b* may display the first indication 1531*b* indicating a user of the electronic device 1501*b* and a third message 1532*b* based on the second natural language input.

In operation 1019, the electronic device 10 may transmit the second natural language input received in operation 1017 to the first NLP server 41.

In operation 1021, the first NLP server 41 may analyze the meaning of the second natural language input so as to select the second NLP server 42 specified by the second natural language input.

In operation 1023, the first NLP server 41 may allow the selected second NLP server 42 to participate in the chat room.

In operation 1025, the electronic device 401 may transmit the first natural language input received in operation 1007 to the second NLP server 42. According to an alternative embodiment, instead of operation 1025, in operation 1026, the first NLP server 41 may transmit the first natural language input received in operation 1009 to the second NLP server 42. That is, in the case where the first NLP server 41 is not associated with a domain corresponding to the first natural language input, at least part of the first natural language input may be transmitted to the second NLP server 42 from either the electronic device 401 or the first NLP server 41.

In operation 1027, the second NLP server 42 may process the first natural language input received in operation 1025 or operation 1026 to generate a second response. The second response may be generated based on a second context derived from the first natural language input and may include content associated with the service provided by the second NLP server 42. The second NLP server 42 may use natural languages included in its second NLU pool according to natural language algorithms so as to generate a natural language second response.

In operation 1029, the second NLP server 42 may transmit the second response to the electronic device 10.

In operation 1031, if the electronic device 10 receives the second response from the second NLP server 42, the electronic device 10 may display, on the chat room UI, a third indication indicating the second NLP server 42 and a fourth message based at least partly on the second response.

For example, referring to FIG. 15A, the electronic device 1501*a* may receive a second response saying that "Hi there! I retrieved some flights departing from your place to Seattle on June 6th. see more; www.airairair.com; JFK-SEA 14:30 2 seats available; JFK-SEA 16:30 24 seats available; JFK-SEA 00:30 84 seats available." The second response may be received from an "Air-bot" server, which is an example of the second NLP server 42. The electronic device 1501*a* may display a third indication 1541*a* indicating the "Air-bot" server and a fourth message 1542*a* based on the second response. The content associated with the service provided by the "Air-bot" server (i.e. flight reservation service) may be included in the fourth message 1542*a*.

In another example, referring to FIG. 15B, the electronic device 1501*b* may receive the second response saying that "Hi there! What can I help you? Blended, chillo, chocolate, coffee, espresso, protein shake, and tea are available. You can order and make payment via this conversation. Drinks you ordered can be taken out at the 233th Blenz Coffee (see location)." The second response may be received from a "BLENZ-bot" server, which is an example of the second NLP server 42. The electronic device 1501*b* may display a third indication 1541*b* indicating the "BLENZ-bot" server and a fourth message 1542*b* based on the second response. The content associated with the service (provided by the second NLP server 42 (i.e. a service for the remote ordering of beverages) may be included in the fourth message 1542*b*. In one embodiment, the user of the electronic device 1501*b* may remotely order beverages and affect payment using the chat room UI displayed on the touchscreen display 1500*b*.

Figure 11:
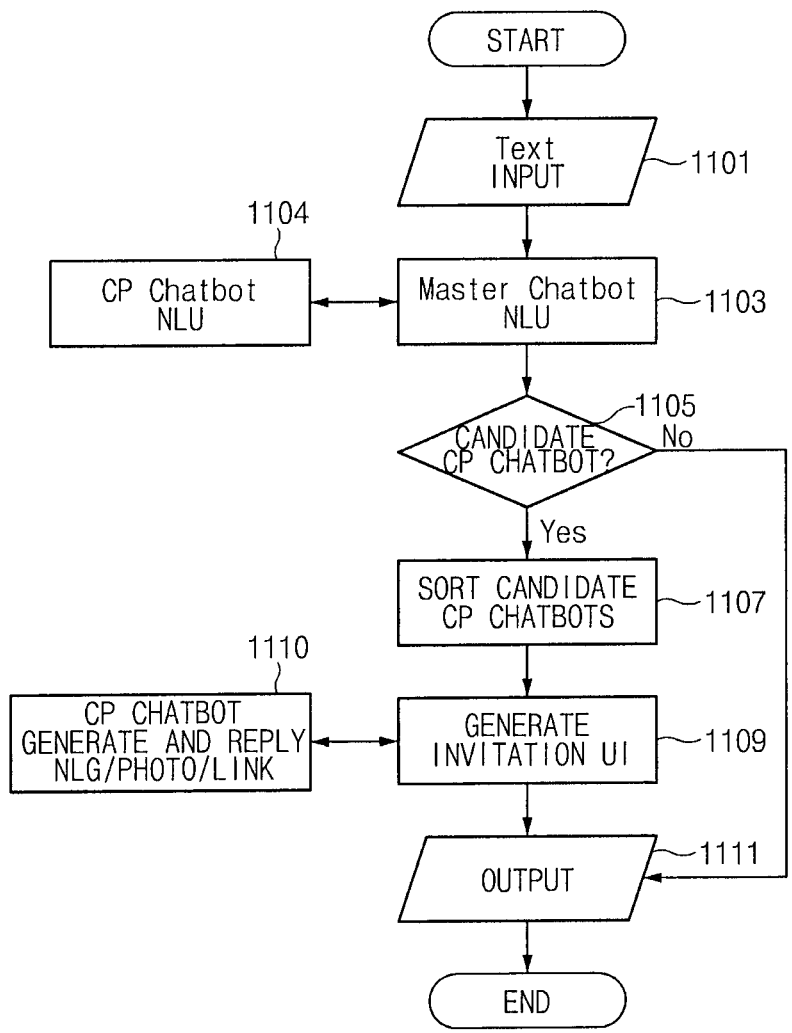
FIG. 11 is a flowchart illustrating a content providing method based on natural language understanding, according to an embodiment.

FIG. 11 is a flowchart illustrating a content providing method based on natural language understanding, according to an embodiment.

Referring to FIG. 11, the content providing method according to an embodiment may include operation 1101 to operation 1111.

In operation 1101, the electronic device 10 may receive a natural language input from a user. The natural language input may be transmitted to a master chatbot when the electronic device 10 and the master chatbot are both participating in a chat room of a messaging application.

In operation 1103, the master chatbot may extract context from the natural language input by using an NLU pool. The master chatbot can then retrieve a CP chatbot 1104 suitable for the extracted context. In other words, the master chatbot may transmit the natural language input to the CP chatbot 1104 belonging to a specific domain corresponding to the extracted context. For example, the master chatbot may transmit the natural language input to the CP chatbot 1104 belonging to a weather domain when the natural language input is a request for weather information. The CP chatbot 1104 may return a response message and a confidence level to the master chatbot. The CP chatbot 1104 may be a plurality of chatbots.

In operation 1105, the master chatbot may select a candidate CP chatbot from among the plurality of chatbots. For example, the master chatbot may select a candidate CP chatbot, based on the received confidence levels. When a candidate CP chatbot is selected, the master chatbot may proceed to operation 1107; otherwise, the master chatbot may proceed to operation 1111.

In operation 1107, the master chatbot may sort candidate CP chatbots. For example, the master chatbot may sort the candidate CP chatbots based on confidence level, from the highest confidence level to the lowest. This way, the master chatbot may induce the user to select the candidate CP chatbot with the highest confidence level.

In operation 1109, if the user of the electronic device selects one of the candidate CP chatbots, the master chatbot may generate a UI for inviting the selected CP chatbot to the chat room. In operation 1110, the selected CP chatbot may provide a natural language response using NLG, which may include text, photo, link, etc.

In operation 1111, the natural language input from the user and the response of the master chatbot or the CP chatbot may be output in a dialog format in a UI of the messaging application. According to an embodiment, in the case where no candidate CP chatbot is found in operation 1105, the master chatbot may output a guidance message requesting from the user another natural language input refining his or her request.

Figure 12:
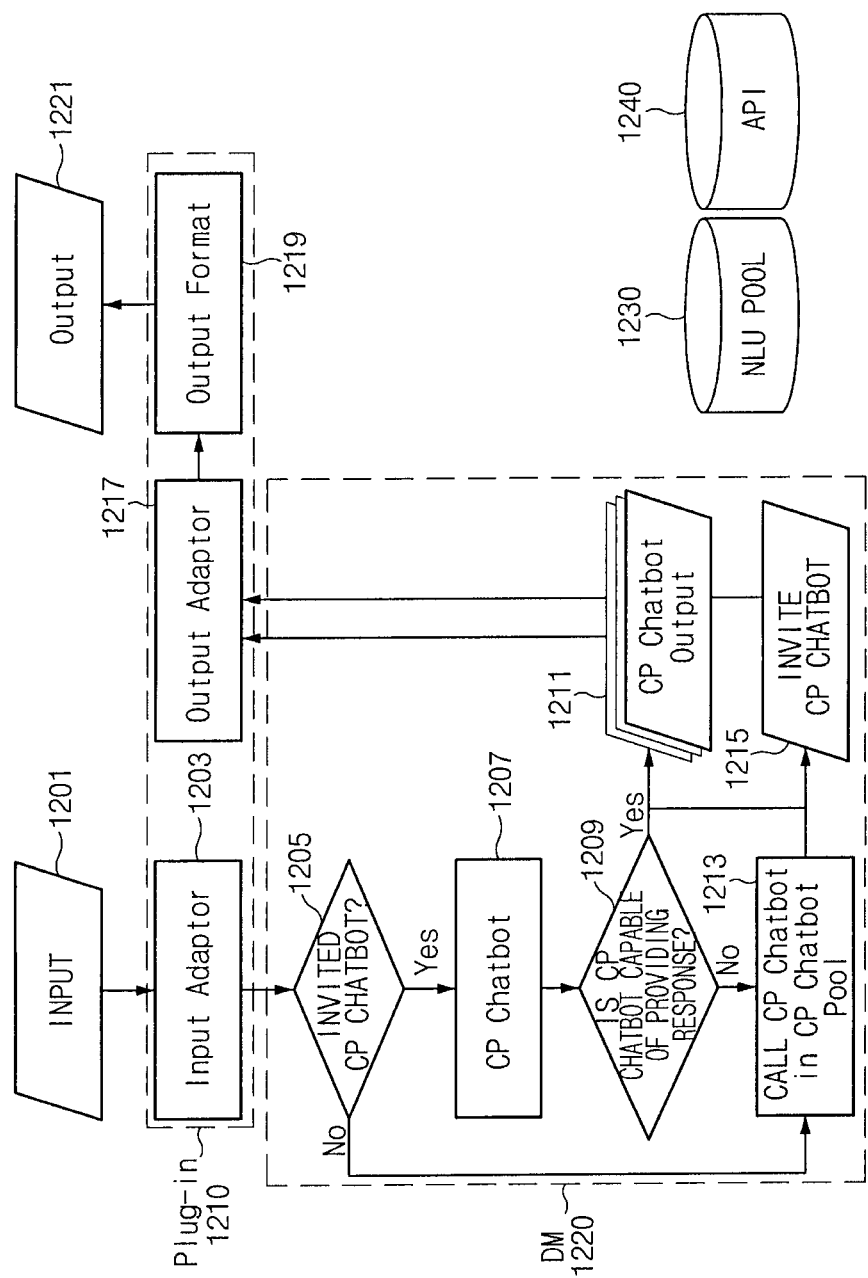
FIG. 12 is a diagram illustrating a content providing method, according to an embodiment.

FIG. 12 is a diagram illustrating a content providing method, according to an embodiment.

Referring to FIG. 12, the content providing method according to an embodiment may include operation 1201 to operation 1221. According to an embodiment, a master chatbot (e.g., the master chatbot 41 of FIG. 1) may include a messaging application plug-in 1210, a DM 1220, an NLU pool 1230, and an API 1240.

In operation 1201, the electronic device may receive a natural language input from a user. The natural language input may be displayed as text in the chat room in which the electronic device and the master chatbot participate.

In operation 1203, the master chatbot may obtain the natural language input received from the electronic device, through an input adaptor of the messaging application plug-in 1210.

In operation 1205, the DM 1220 of the master chatbot may determine whether a CP chatbot is already present in the chat room. The CP chatbot may have been previously invited into the chat room. In the case where the CP chatbot is already present, the procedure may proceed to operation 1207; otherwise, the procedure may proceed to operation 1213.

In operation 1207, the CP chatbot that is already in the chat room may receive the natural language input from the DM 1220 of the master chatbot and may analyze the context of the natural language input. The master chatbot and the CP chatbot may transmit and receive information, data, or the like to or from each other via the API 1240.

In operation 1209, the CP chatbot that is already in the chat room may determine whether it can provide a proper response to the natural language input. If so, the procedure may proceed to operation 1211; otherwise, the procedure may proceed to operation 1213.

In operation 1211, since the CP chatbot that is already in the chat room is capable of providing the proper response corresponding to the natural language input, the CP chatbot may provide such a response. The response may be expressed using natural language and transmitted to the DM 1220 of the master chatbot.

In operation 1213, if there is no CP chatbot in the chat room or if the CP chatbot in the chat room is not capable of providing a proper response to the natural language input, the DM 1220 of the master chatbot may analyze the context of the natural language input by using the NLU pool 1230. After the analysis, the master chatbot may call the pool of CP chatbots and may retrieve the CP chatbot capable of providing the proper response based on the context.

In operation 1215, the DM 1220 of the master chatbot may invite the CP chatbot retrieved in operation 1213 to the chat room. Afterwards, in operation 1211, the retrieved CP chatbot may provide the proper response corresponding to the natural language input to the DM 1220 of the master chatbot.

In operation 1217, the plug-in 1210 of the master chatbot, using an output adaptor, may obtain the response received from the CP chatbot.

In operation 1219, the plug-in 1210 of the master chatbot may convert or format the response received from the CP chatbot into a format compatible with a messaging application, by using an output format module.

In operation 1217, the plug-in 1210 of the master chatbot may transmit the converted response to a server operating the messaging application. The response may be then output in the chat room by the messaging application.

Figure 13:
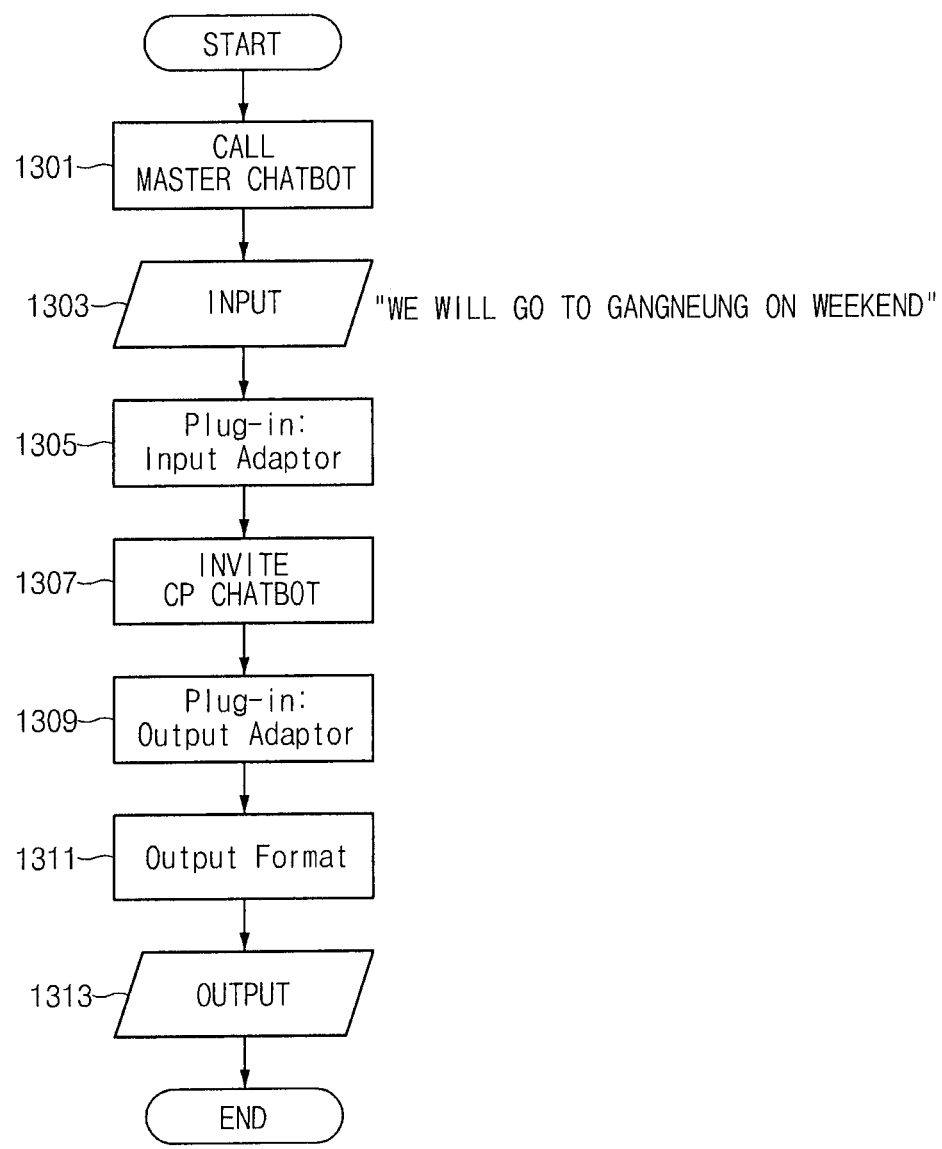
FIG. 13 is a diagram illustrating a content providing method, according to another embodiment.

FIG. 13 is a diagram illustrating a content providing method, according to an embodiment.

Referring to FIG. 13, the content providing method according to an embodiment may include operation 1301 to operation 1313.

In operation 1301, an electronic device may call a master chatbot (e.g., the master chatbot 41 of FIG. 1) in a chat room of a messaging application. According to one embodiment, the master chatbot may be called by default when the chat room is first initialized. In this case, operation 1301 may be skipped.

In operation 1303, the electronic device may receive a natural language input (e.g., "We will go to Gangneung on weekend"). The natural language input may be displayed as text in the chat room in which the electronic device and the master chatbot participate.

In operation 1305, the master chatbot may obtain a natural language input received from the electronic device, through an input adaptor of a messaging application plug-in.

In operation 1307, the master chatbot may call the pool of CP chatbots and may retrieve the CP chatbot capable of providing a proper response to the natural language input. The master chatbot may invite the retrieved CP chatbot to the chat room.

In operation 1309, the CP chatbot invited to the chat room may generate the proper response (e.g., weekend weather in Gangneung, transportation to Gangneung, or the like) and may provide the proper response to the master chatbot. The master chatbot may obtain the response through the output adaptor of the messaging application plug-in.

In operation 1311, the master chatbot may convert or format the response received from the CP chatbot into a format compatible with a messaging application.

In operation 1313, the master chatbot may transmit the formatted response to a server operating the messaging application. The response may then be output in the chat room by the messaging application.

Figure 16:
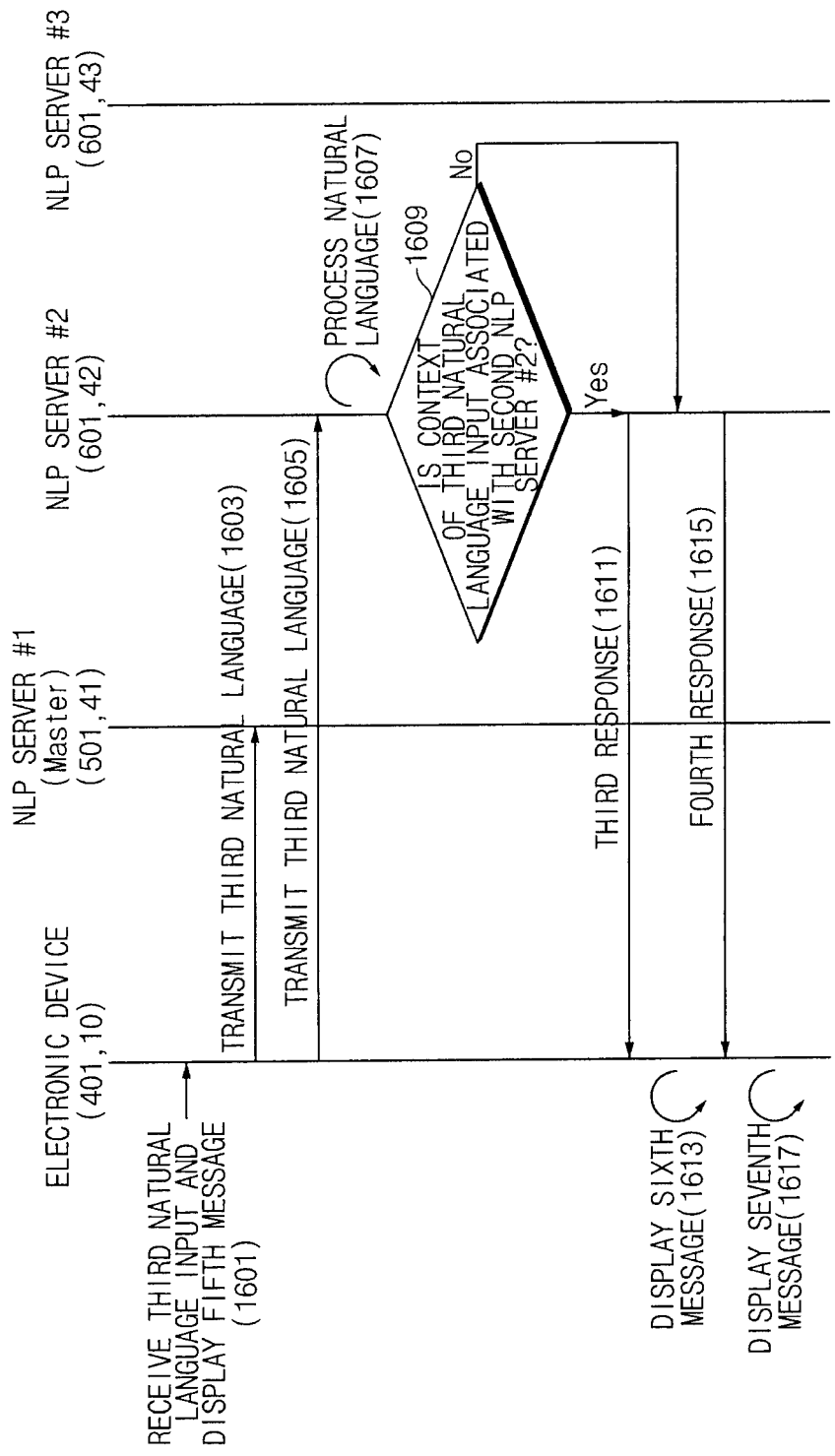
FIG. 16 is a sequence diagram illustrating a content providing method based on natural language understanding, according to an embodiment.
Figure 17:
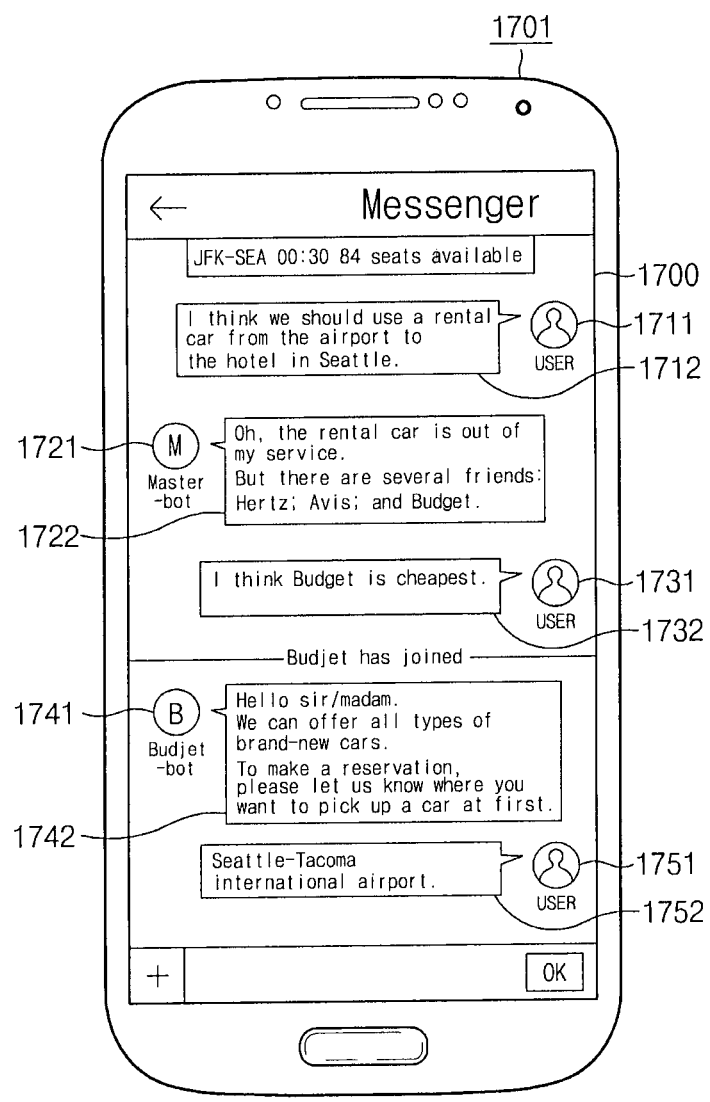
FIG. 17 is a view illustrating an electronic device performing a content providing method, according to an embodiment.

FIG. 16 is a sequence diagram illustrating a content providing method based on natural language understanding, according to an embodiment. FIG. 17 is a view illustrating an electronic device performing a content providing method, according to an embodiment.

Referring to FIG. 16, the content providing method according to an embodiment may include operation 1601 to operation 1617. For example, operation 1601 to operation 1617 may be performed after operation 1001 to operation 1031 illustrated in FIG. 10. For ease of description, an exemplary user interface generated by operations 1601 to 1617 are shown in FIG. 17, which will be described together with FIG. 16. For example, a touchscreen display 1700 of an electronic device 1701 illustrated in FIG. 17 may output a screen that follows the fourth message 1542*a* illustrated in FIG. 15A.

In operation 1601, the electronic device 10 may receive a third natural language input from the user. If the third natural language input is received, the electronic device 10 may display, on a chat room UI, a first indication indicating the user and a fifth message based at least partly on the third natural language input.

For example, referring to FIG. 17, if the electronic device 1701 receives a third natural language input saying that "I think we should use a rental car from the airport to the hotel in Seattle," the electronic device 1701 may display on the touchscreen display 1700 a first indication 1711 indicating a user of the electronic device 1701 and a fifth message 1712 based on the third natural language input.

In operation 1603 and operation 1605, the electronic device 10 may transmit the third natural language input to the first NLP server (master chatbot) 41 and the second NLP server (CP chatbot) 42, which are participants in the chat room with the electronic device 10.

In operation 1607 and operation 1609, the second NLP server 42 may analyze the context and/or meaning of the third natural language input and may determine whether the context of the third natural language input is associated with the second NLP server 42. In the case where the context of the third natural language input is associated with the second NLP server 42, the procedure may proceed to operation 1611; otherwise, the procedure may proceed to operation 1615.

In operation 1611, since the context of the third natural language input is associated with the second NLP server 42, the second NLP server 42 may process the third natural language input to generate a third response. The third response may be generated based on context derived from the third natural language input and may include content associated with the service provided by the second NLP server 42.

In operation 1613, the electronic device 10 may display, on the chat room UI, a third indication indicating the second NLP server 42 and a sixth message based on the received third response.

In operation 1615, if the second NLP server 42 is not associated with the context of the third natural language input, the second NLP server 42 may generate a fourth response indicating other NLP server(s) that are capable of providing a proper response corresponding to the third natural language input.

In operation 1617, the electronic device 10 may display, on the chat room UI, the third indication indicating the second NLP server 42 and a seventh message based on the received fourth response.

For example, referring to FIG. 17, when the second NLP server 42 is the "Air-bot" server associated with flight services, the electronic device 1701 may receive a fourth response saying that "Oh, the rental car is out of my service. But there are several friends; Hertz; Avis; and Budget." The electronic device 1701 may display a third indication 1721 indicating the "Air-bot" server and a seventh message 1722 based on the fourth response. As illustrated in the seventh message 1722, since the "Air-bot" server provides the flight reservation service, the "Air-bot" server may recommend another NLP server or CP chatbot operated by car rental companies (e.g., Hertz, Avis, and Budget).

In FIG. 16, operations after operation 1617 are not shown. However, as shown in FIG. 17, other NLP servers may continue to perform the operations shown in FIG. 10.

For example, referring to FIG. 17, the electronic device 1701 may receive an additional natural language input saying that "I think Budget is cheapest." A message 1732 based on the natural language input, which refers to a "Budget-bot" server (e.g. the third NLP server 43), may be displayed in the chat room UI together with a first indication 1731 indicating the user.

The "Budget-bot" server may then participate in the chat room with the user of the electronic device 1701. The "Budget-bot" server may receive the third natural language input ("I think we should use a rental car from the airport to the hotel in Seattle.") from the "Air-bot" server or the electronic device 1701. The "Budget-bot" server may process the third natural language input to provide the electronic device 1701 with a response saying that "Hello sir/madam. We can offer all types of brand-new cars. To make a reservation, please let us know where you want to pick up a car at first." The electronic device 1701 may display a message 1742 based on the response, together with an indication 1741 indicating the "Budget-bot" server. Afterwards, as illustrated in a message 1752, the user may interact with the "Budget-bot" server by entering additional natural language inputs to reserve and pay for a car rental.

FIGS. 18 to 24 illustrate dialogs between an electronic device and chatbot servers, according to various embodiments.

FIGS. 18 to 24 illustrate various examples of dialogs between an electronic device and chatbot servers.

Referring to FIG. 18, dialog use case 1801 to dialog use case 1803 are illustrated. For example, dialog use case 1802 or dialog use case 1803 may be made after dialog use case 1801.

According to dialog use case 1801, a master chatbot M and a user U may be participants in a chat room. In the same chat room, there may be no CP chatbot capable of providing a proper answer to the question posed the user U. For example, the user U may provide a natural language input saying that "Let me know tomorrow's Seoul weather" to the electronic device. The natural language input may be shown as text in the chat room UI.

According to dialog use case 1802, the master chatbot M may invite a weather chatbot W #1 to the chat room. The weather chatbot W #1 may be capable of providing a proper answer to the natural language input. The weather chatbot W #1 may provide a proper answer saying that "Tomorrow's Seoul weather is minus 5 degrees in the morning and 4 degrees in daytime and is 1-2 degrees lower than today. The sensible temperature is expected to decrease as the wind blows strongly."

According to dialog use case 1803, when there are a plurality of chatbots available to answer the natural language input, the master chatbot M may provide a list of the weather chatbots (e.g., W #1 and W #2). The master chatbot M may select a weather chatbot (e.g., W #1) if the user selects W #1 by text and/or touch input. The selected weather chatbot (e.g., W #1) may then provide a proper answer saying that "Tomorrow's Seoul weather is minus 5 degrees in the morning and 4 degrees in daytime and is 1-2 degrees lower than today. The sensible temperature is expected to decrease as the wind blows strongly."

Referring to FIG. 19, dialog use case 1901 to dialog use case 1903 are illustrated. For example, dialog use case 1902 or dialog use case 1903 may be made after dialog use case 1901.

According to dialog use case 1901, a master chatbot M and a user U may be participants in a chat room. The master chatbot M recommend a particular CP chatbot to the user. For example, the master chatbot M may output a message (e.g., "there is a new Game-bot. Do you want to meet a new Game-bot?") as a way of recommending a gaming CP chatbot to the user.

According to dialog use case 1902, if the user consents to adding the CP chatbot to the chat room, for example, by entering an input saying "register," the master chatbot M may invite the recommended gaming CP chatbot G #1 to the chat room.

According to dialog use case 1903, if the user rejects the CP chatbot, for example, by entering an input saying "No it's okay," the master chatbot M may not invite the recommended CP chatbot to the chat room. According to an embodiment, the master chatbot M may not recommend the other CP chatbot to the user U in the future if the user so requests, for example if the user enters an input saying "Do not recommend CP Chatbot in the future.".

Referring to FIG. 20, dialog use case 2001 is illustrated. According to an embodiment, while having a dialog with the user U, a CP chatbot may recommend another CP chatbot associated with the dialog.

For example, according to dialog use case 2001, after finishing a hotel reservation dialog with the user U, a hotel reservation chatbot H #1 may ask the user U a question (e.g., "Would you drive to the hotel by yourself? Or would you use public transportation?") regarding the transportation associated with the hotel reservation. If the user U provides a response (e.g., "I'll drive"), the hotel reservation chatbot H #1 may recommend a gas station chatbot Gas #1, which is associated with driving. The hotel reservation chatbot H #1 may also invite the gas station chatbot Gas #1 to a chat room after obtaining consent from the user U (e.g., "Yes, please recommend it").

Referring to FIG. 21, dialog use case 2101 to dialog use case 2103 are illustrated. For example, dialog use case 2102 may be made after dialog use case 2101. Dialog use case 2103 may be made independently of dialog use case 2101 and dialog use case 2102.

According to dialog use case 2101, a master chatbot M and a user U may be participants in a chat room. According to an embodiment, the user U may request the master chatbot M to invite the already known CP chatbot to the chat room. For example, the user U may explicitly request the master chatbot M to invite a cafe chatbot C #1 (cafe chatbot).

According to dialog use case 2102, the master chatbot M may recommend the cafe chatbot C #1 in response to the request from the user U.

According to an embodiment, in the case where the master chatbot M does not find a single CP chatbot in response to the natural language input from the user U, the master chatbot M may recommend a plurality of candidate CP chatbots.

For example, according to dialog use case 2102, the master chatbot M may receive a natural language input saying "call a sandwich," from the user U. In the case where the master chatbot M does not find a single CP chatbot in response to the natural language input, the master chatbot M may recommend the plurality of candidate CP chatbots (e.g., sandwich chatbots #1, #2, #3, and #4). If the user U selects the sandwich chatbot #4 among the plurality of candidate CP chatbots, the master chatbot M may invite the sandwich chatbot #4 (S #4) to the chat room.

Referring to FIG. 22, dialog use case 2201 to dialog use case 2203 are illustrated. For example, dialog use case 2201 to dialog use case 2203 may proceed sequentially. According to dialog use case 2201 to dialog use case 2203, the cafe chatbot C #1 and the user U may be participants in a chat room.

According to dialog use case 2201, the user U may transmit a natural language input (e.g., "order coffee") to the cafe chatbot C #1 in the chat room.

According to dialog use case 2202, the user U may order three cups of coffee through dialog with the cafe chatbot C #1. The cafe chatbot C #1 may derive the context of the dialog to process the order for three cups of coffee. For example, the cafe chatbot C #1 may order two cups of Caramel Macchiato and a cup of hot chocolate (using low fat milk) with the condition that the user U pick up the order at 3:10 at a particular branch of the cafe.

According to dialog use case 2203, the cafe chatbot C #1 may take payment in the chat room by using an API of a pre-registered payment application (e.g., Samsung Pay™).

Referring to FIG. 23, dialog use case 2301 to dialog use case 2305 are illustrated. For example, dialog use case 2301 to dialog use case 2305 may proceed sequentially. In dialog use case 2301 to dialog use case 2305, a master chatbot M, a first cafe chatbot C #1, a second cafe chatbot C #2, a third cafe chatbot C #3, and a user U may be participants in a chat room.

According to dialog use case 2301, the user U may transmit a natural language input (e.g., "order coffee") to the cafe chatbot C #1 in the chat room.

According to dialog use case 2302, the master chatbot M may provide notification that three cafe chatbots C #1, C #2, and C #3, which are the participants in the chat room, are capable of processing the coffer order and may ask which cafe chatbot the user wishes to use.

According to dialog use case 2303, the user U may select the third cafe chatbot C #3. The user U may specify a particular branch of the third cafe chatbot C #3. For example, the user U may specify a branch near his or her workplace.

According to dialog use case 2304, the user U may order seven cups of coffee through a dialog with the third cafe chatbot C #3. The third cafe chatbot C #3 may derive the context of the dialog to process the order of seven cups of coffee. For example, the third cafe chatbot C #3 may order three cups of ice Americano, a cup of ice latte, and three cups of mocha. The third cafe chatbot C #3 may analyze the context of keywords such as "in front of the workplace" to understand that the user U wishes to designate the branch near his or her workplace for picking up the order.

According to dialog use case 2305, the third cafe chatbot C #3 may take payment in the chat room by using an API of a pre-registered payment application (e.g., Samsung Pay™).

Referring to FIG. 24, dialog use case 2401 is illustrated. According to an embodiment, the specified CP chatbot may be excluded from the chat room by the natural language input from the user U. According to the dialog use case 2401, the master chatbot M, the weather chatbot W #1, and the user U may be participants of a chat room.

For example, according to dialog use case 2401, the master chatbot M and the weather chatbot W #1 may receive a natural language input saying that "Weather Chatbot #1, please exit from the chat room," from the user U. The weather chatbot W #1 may be excluded from the chat room in response to the natural language input. If the weather chatbot W #1 is excluded, the master chatbot M may display a guidance message saying that the weather chatbot W #1 is capable of rejoining the chat room.

Figure 25:
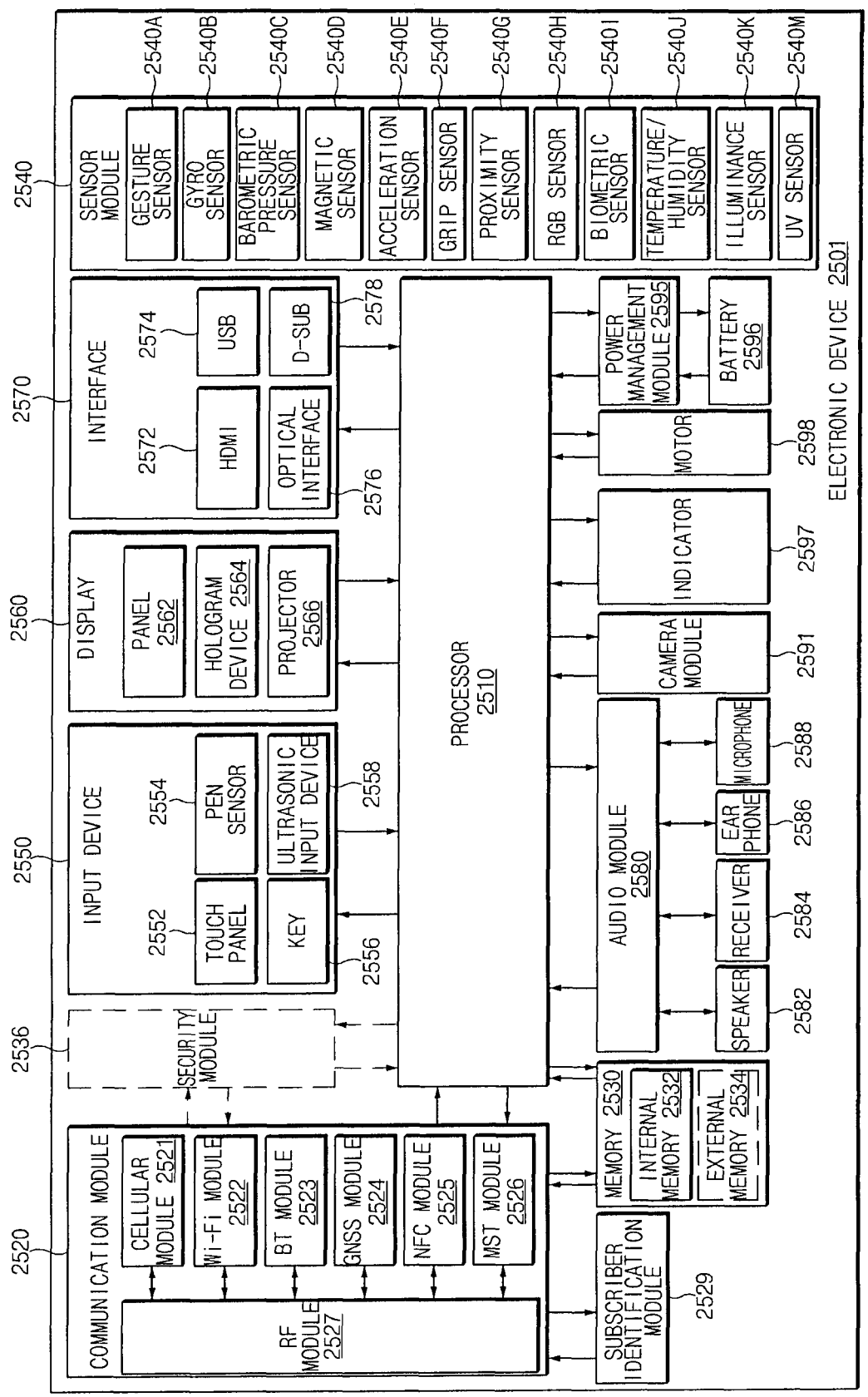
FIG. 25 is a block diagram illustrating the electronic device, according to an embodiment.

FIG. 25 illustrates a block diagram of an electronic device, according to an embodiment.

Referring to FIG. 25, an electronic device 2501 may include, for example, all or a part of the electronic device 10 illustrated in FIG. 4. The electronic device 2501 may include one or more processors (e.g., an application processor (AP)) 2510, a communication module 2520, a subscriber identification module 2529, a memory 2530, a sensor module 2540, an input device 2550, a display 2560, an interface 2570, an audio module 2580, a camera module 2591, a power management module 2595, a battery 2596, an indicator 2597, and a motor 2598.

The processor 2510 may drive, for example, an operating system (OS) or an application to control a plurality of hardware or software elements connected to the processor 2510 and may process and compute a variety of data. For example, the processor 2510 may be implemented with a System on Chip (SoC). According to an embodiment, the processor 2510 may further include a graphic processing unit (GPU) and/or an image signal processor. The processor 2510 may include at least a part (e.g., a cellular module 2521) of elements illustrated in FIG. 25. The processor 2510 may load an instruction or data, which is received from at least one of other elements (e.g., a nonvolatile memory), into a volatile memory and process the loaded instruction or data. The processor 2510 may store a variety of data in the nonvolatile memory.

The communication module 2520 may include the cellular module 2521, a Wi-Fi module 2522, a Bluetooth (BT) module 2523, a GNSS module 2524 (e.g., a GPS module, a Glonass module, a Beidou module, or a Galileo module), a near field communication (NFC) module 2525, a MST module 2526 and a radio frequency (RF) module 2527.

The cellular module 2521 may provide, for example, voice communication, video communication, a character service, an Internet service, or the like over a communication network. According to an embodiment, the cellular module 2521 may perform discrimination and authentication of the electronic device 2501 within a communication network by using the subscriber identification module (e.g., a SIM card) 2529. According to an embodiment, the cellular module 2521 may perform at least a portion of functions that the processor 2510 provides. According to an embodiment, the cellular module 2521 may include a communication processor (CP).

Each of the Wi-Fi module 2522, the BT module 2523, the GNSS module 2524, the NFC module 2525, or the MST module 2526 may include a processor for processing data exchanged through a corresponding module, for example. According to an embodiment, at least a part (e.g., two or more) of the cellular module 2521, the Wi-Fi module 2522, the BT module 2523, the GNSS module 2524, the NFC module 2525, or the MST module 2526 may be included within one Integrated Circuit (IC) or an IC package.

For example, the RF module 2527 may transmit and receive a communication signal (e.g., an RF signal). For example, the RF module 2527 may include a transceiver, a power amplifier module (PAM), a frequency filter, a low noise amplifier (LNA), an antenna, or the like. According to another embodiment, at least one of the cellular module 2521, the Wi-Fi module 2522, the BT module 2523, the GNSS module 2524, the NFC module 2525, or the MST module 2526 may transmit and receive an RF signal through a separate RF module.

The subscriber identification module 2529 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 2530 may include an internal memory 2532 or an external memory 2534. For example, the internal memory 2532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 2534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 2534 may be operatively and/or physically connected to the electronic device 2501 through various interfaces.

A security module 2536 may be a module that includes a storage space of which a security level is higher than that of the memory 2530 and may be a circuit that guarantees safe data storage and a protected execution environment. The security module 2536 may be implemented with a separate circuit and may include a separate processor. For example, the security module 2536 may be in a smart chip or a secure digital (SD) card, which is removable, or may include an embedded secure element (eSE) embedded in a fixed chip of the electronic device 2501. Furthermore, the security module 2536 may operate based on an operating system (OS) that is different from the OS of the electronic device 2501. For example, the security module 2536 may operate based on java card open platform (JCOP) OS.

The sensor module 2540 may measure, for example, a physical quantity or may detect an operation state of the electronic device 2501. The sensor module 2540 may convert the measured or detected information to an electric signal. For example, the sensor module 2540 may include at least one of a gesture sensor 2540A, a gyro sensor 2540B, a barometric pressure sensor 2540C, a magnetic sensor 2540D, an acceleration sensor 2540E, a grip sensor 2540F, the proximity sensor 2540G, a color sensor 2540H (e.g., red, green, blue (RGB) sensor), a biometric sensor 2540I, a temperature/humidity sensor 2540J, an illuminance sensor 2540K, or an UV sensor 2540M. Although not illustrated, additionally or generally, the sensor module 2540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2540 may further include a control circuit for controlling at least one or more sensors included therein. According to an embodiment, the electronic device 2501 may further include a processor that is a part of the processor 2510 or independent of the processor 2510 and is configured to control the sensor module 2540. The processor may control the sensor module 2540 while the processor 2510 remains at a sleep state.

The input device 2550 may include, for example, a touch panel 2552, a (digital) pen sensor 2554, a key 2556, or an ultrasonic input unit 2558. For example, the touch panel 2552 may use at least one of capacitive, resistive, infrared and ultrasonic detecting methods. Also, the touch panel 2552 may further include a control circuit. The touch panel 2552 may further include a tactile layer to provide a tactile reaction to a user.

The (digital) pen sensor 2554 may be, for example, a part of a touch panel or may include an additional sheet for recognition. The key 2556 may include, for example, a physical button, an optical key, a keypad, or the like. The ultrasonic input device 2558 may detect (or sense) an ultrasonic signal, which is generated from an input device, through a microphone (e.g., a microphone 2588) and may check data corresponding to the detected ultrasonic signal.

The display 2560 (e.g., the touchscreen display 430) may include a panel 2562, a hologram device 2564, or a projector 2566. The panel 2562 may be implemented, for example, to be flexible, transparent or wearable. The panel 2562 and the touch panel 2552 may be integrated into a single module. The hologram device 2564 may display a stereoscopic image in a space using a light interference phenomenon. The projector 2566 may project light onto a screen so as to display an image. For example, the screen may be arranged in the inside or the outside of the electronic device 2501. According to an embodiment, the panel 2562 may include a pressure sensor (or a force sensor) capable of measuring the intensity of pressure associated with the touch of a user. The pressure sensor may be integrally implemented with the touch panel 2552 or may be implemented with one or more sensors independently of the touch panel 2552. According to an embodiment, the display 2560 may further include a control circuit for controlling the panel 2562, the hologram device 2564, or the projector 2566.

The interface 2570 may include, for example, a high-definition multimedia interface (HDMI) 2572, a universal serial bus (USB) 2574, an optical interface 2576, or a D-subminiature (D-sub) 2578. Additionally or generally, the interface 2570 may include, for example, a mobile high definition link (MHL) interface, a SD card/multi-media card (MMC) interface, or an infrared data association (IrDA) standard interface.

The audio module 2580 may convert a sound and an electric signal in dual directions. The audio module 2580 may process, for example, sound information that is input or output through a speaker 2582, a receiver 2584, an earphone 2586, or the microphone 2588.

For example, the camera module 2591 may shoot a still image or a video. According to an embodiment, the camera module 2591 may include at least one or more image sensors (e.g., a front sensor or a rear sensor), a lens, an image signal processor (ISP), or a flash (e.g., an LED or a xenon lamp).

The power management module 2595 may manage, for example, power of the electronic device 2501. According to an embodiment, a power management integrated circuit (PMIC), a charger IC, or a battery or fuel gauge may be included in the power management module 2595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2596 and a voltage, current or temperature thereof while the battery is charged. The battery 2596 may include, for example, a rechargeable battery and/or a solar battery.

The indicator 2597 may display a specific state of the electronic device 2501 or a part thereof (e.g., the processor 2510), such as a booting state, a message state, a charging state, and the like. The motor 2598 may convert an electrical signal into a mechanical vibration and may generate the following effects: vibration, haptic, and the like. Although not illustrated, a processing device (e.g., a GPU) for supporting a mobile TV may be included in the electronic device 2501. The processing device for supporting the mobile TV may process media data according to the standards of digital multimedia broadcasting (DMB), digital video broadcasting (DVB), MediaFlo™, or the like.

Each of the above-mentioned elements of the electronic device according to an embodiment of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 26:
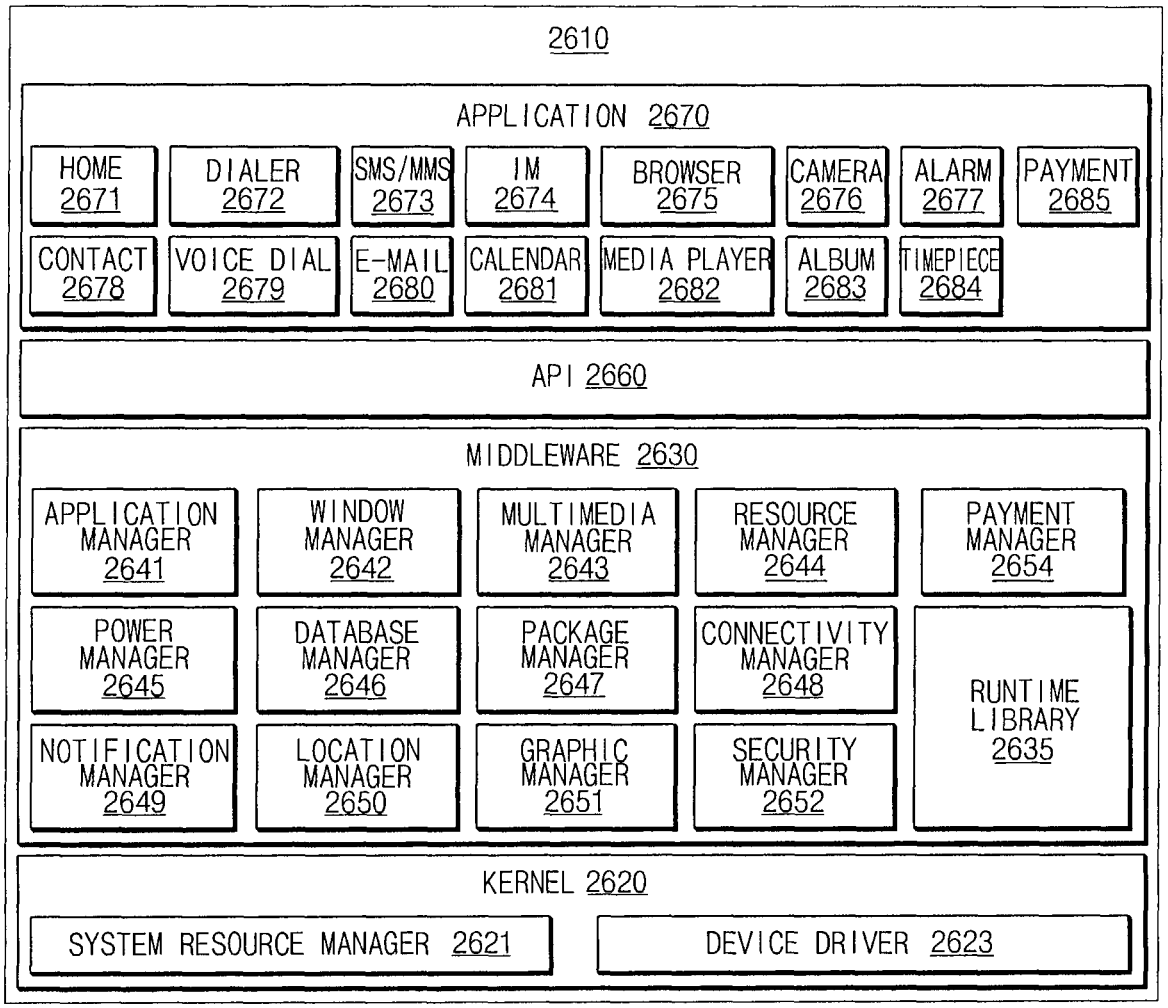
FIG. 26 is a block diagram illustrating a program module, according to an embodiment.

FIG. 26 illustrates a block diagram of a program module, according to an embodiment.

According to an embodiment, a program module 2610 may include an operating system (OS) to control resources associated with an electronic device, and/or diverse applications driven on the OS. The OS may be, for example, Android, iOS, Windows, Symbian, Tizen, or Bada.

The program module 2610 may include a kernel 2620, a middleware 2630, an application programming interface (API) 2660, and/or an application 2670. At least a portion of the program module 2610 may be preloaded on an electronic device or may be downloadable from an external electronic device.

The kernel 2620 (e.g., the kernel 471) may include, for example, a system resource manager 2621 or a device driver 2623. The system resource manager 2621 may perform control, allocation, or retrieval of system resources. According to an embodiment, the system resource manager 2621 may include a process managing unit, a memory managing unit, or a file system managing unit. The device driver 2623 may include, for example, a display driver, a camera driver, a Bluetooth driver, a shared memory driver, a USB driver, a keypad driver, a Wi-Fi driver, an audio driver, or an inter-process communication (IPC) driver.

The middleware 2630 may provide, for example, a function that the application 2670 needs in common, or may provide diverse functions to the application 2670 through the API 2660 to allow the application 2670 to efficiently use limited system resources of the electronic device. According to an embodiment, the middleware 2630 (e.g., the middleware 473) may include at least one of a runtime library 2635, an application manager 2641, a window manager 2642, a multimedia manager 2643, a resource manager 2644, a power manager 2645, a database manager 2646, a package manager 2647, a connectivity manager 2648, a notification manager 2649, a location manager 2650, a graphic manager 2651, a security manager 2652, or a payment manager 2654.

The runtime library 2635 may include, for example, a library module that is used by a compiler to add a new function through a programming language while the application 2670 is being executed. The runtime library 2635 may perform input/output management, memory management, or capacities about arithmetic functions.

The application manager 2641 may manage, for example, a life cycle of at least one application of the application 2670. The window manager 2642 may manage a graphic user interface (GUI) resource that is used in a screen. The multimedia manager 2643 may identify a format necessary for playing diverse media files, and may perform encoding or decoding of media files by using a codec suitable for the format. The resource manager 2644 may manage resources such as a storage space, memory, or source code of at least one application of the application 2670.

The power manager 2645 may operate, for example, with a basic input/output system (BIOS) to manage a battery or power, and may provide power information for an operation of an electronic device. The database manager 2646 may generate, search for, or modify database that is to be used in at least one application of the application 2670. The package manager 2647 may install or update an application that is distributed in the form of package file.

The connectivity manager 2648 may manage, for example, wireless connection such as Wi-Fi or Bluetooth. The notification manager 2649 may display or notify an event such as arrival message, appointment, or proximity notification in a mode that does not disturb a user. The location manager 2650 may manage location information about an electronic device. The graphic manager 2651 may manage a graphic effect that is provided to a user, or manage a user interface relevant thereto. The security manager 2652 may provide a general security function necessary for system security, user authentication, or the like. According to an embodiment, in the case where an electronic device includes a telephony function, the middleware 2630 may further include a telephony manager for managing a voice or video call function of the electronic device.

The middleware 2630 may include a middleware module that combines diverse functions of the above-described elements. The middleware 2630 may provide a module specialized to each OS kind to provide differentiated functions. Additionally, the middleware 2630 may dynamically remove a part of the preexisting elements or may add new elements thereto.

The API 2660 may be, for example, a set of programming functions and may be provided with a configuration that is variable depending on an OS. For example, in the case where an OS is Android or iOS, it may provide one API set per platform. In the case where an OS is Tizen, it may provide two or more API sets per platform.

The application 2670 may include, for example, one or more applications capable of providing functions for a home 2671, a dialer 2672, an SMS/MMS 2673, an instant message (IM) 2674, a browser 2675, a camera 2676, an alarm 2677, a contact 2678, a voice dial 2679, an e-mail 2680, a calendar 2681, a media player 2682, an album 2683, a timepiece 2684, and a payment 2685 or for offering health care (e.g., measuring an exercise quantity, blood sugar, or the like) or environment information (e.g., information of barometric pressure, humidity, temperature, or the like).

According to an embodiment, the application 2670 may include an application (hereinafter referred to as "information exchanging application" for descriptive convenience) to support information exchange between an electronic device (e.g., the electronic device 401) and an external electronic device. The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 2670 may include an application (e.g., a health care application of a mobile medical device) that is assigned in accordance with an attribute of an external electronic device. According to an embodiment, the application 2670 may include an application that is received from an external electronic device. According to an embodiment, the application 2670 may include a preloaded application or a third party application that is downloadable from a server. The names of elements of the program module 2610 according to the embodiment may be modifiable depending on kinds of operating systems.

According to various embodiments, at least a portion of the program module 2610 may be implemented by software, firmware, hardware, or a combination of two or more thereof. At least a portion of the program module 2610 may be implemented (e.g., executed), for example, by the processor. At least a portion of the program module 2610 may include, for example, modules, programs, routines, sets of instructions, processes, or the like for performing one or more functions.

According to an embodiment, an electronic device may include a housing, a display exposed through a part of the housing, a communication circuit disposed inside the housing, a processor disposed inside the housing and electrically connected to the display and the communication circuit, and a memory disposed inside the housing and electrically connected to the processor. The memory may be configured to store a messaging application program including a messaging user interface (UI). The memory may store instructions that, when executed, cause the processor to display the messaging UI of the messaging application program on the touchscreen display, to receive a natural language input from a user, to transmit at least a portion of the natural language input to an external server by using the communication circuit, to display, on the messaging UI, a first message based on the natural language input and a first indication indicating the user, to receive a first response from the external server via the communication circuit, to display, on the messaging UI, a second indication indicating a first engine and a second message based on the first response, to receive a second response from the external server via the communication circuit, and to display, on the messaging UI, a third indication indicating a second engine and a third message based on the second response. The first response may be generated by the first engine based on the transmitted portion of the natural language input. The second response may be generated by the second engine based on the transmitted portion of the natural language input.

According to an embodiment, at least part of the first message may include a result of speech recognition of at least part of the natural language input.

According to an embodiment, the second message may include content associated with a first service corresponding to the first engine. The third message may include content associated with a second service corresponding to the second engine.

According to an embodiment, the first response may be generated by the first engine by using a first natural language understanding (NLU) pool corresponding to the transmitted portion of the natural language input. The first NLU pool may include natural language associated with a first service corresponding to the first engine.

According to an embodiment, the first engine may include a first NLU module corresponding to a first domain.

According to an embodiment, the first indication, the second indication, or the third indication may include a text, an image, or a video.

According to an embodiment, the first indication may be displayed adjacent to the first message. The second indication may be displayed adjacent to the second message. The third indication may be displayed adjacent to the third message.

According to an embodiment, the natural language input may be received as a text inputted through an input device.

According to an embodiment, the electronic device may further include a microphone converting speech of the user into an audio signal. When the natural language input is spoken by the user, the instructions may further cause the processor to transmit the audio signal to the external server via the communication circuit and to receive text data corresponding to the audio signal from the external server. The text data may constitute at least part of the first message.

According to an embodiment, an electronic device may include a housing, a display exposed through a part of the housing, a communication circuit disposed inside the housing, a processor disposed inside the housing and electrically connected to the display and the communication circuit, and a memory disposed inside the housing and electrically connected to the processor. The memory may be configured to store a messaging application program including a messaging UI. The memory may further store instructions that, when executed, cause the processor to display the messaging UI of the messaging application program on the display, to receive a first natural language input from a user, to transmit at least a portion of the first natural language input to an external server by using the communication circuit, to display, on the messaging UI, a first message based on the first natural language input and a first indication indicating the user, to receive a first response from the external server via the communication circuit, to display, on the messaging UI, a second indication indicating a first engine and a second message based on the first response, to receive, from the user, a second natural language input indicating a selection of a second engine, to display, on the messaging UI, the first indication and a third message based on the second natural language input, to transmit at least a portion of the second natural language input to the external server by using the communication circuit, to receive a second response from the external server via the communication circuit, and to display, on the messaging UI, a third indication indicating the second engine and a fourth message based on the second response. The first response may be generated by the first engine based on the transmitted portion of the first natural language input and the first response indicates the second engine capable of generating a response corresponding to the first natural language input. The second response may be generated by the second engine based on the transmitted portion of the first natural language input.

According to an embodiment, the first response may be received if the first engine is not associated with a domain corresponding to the first natural language input.

According to an embodiment, if the first engine is not associated with a domain corresponding to the first natural language input, the transmitted portion of the first natural language input may be transmitted to the second engine.

According to an embodiment, the first natural language input may include a natural language associated with a service provided by the second engine.

According to an embodiment, the second engine may include an NLU pool of a domain corresponding to the first natural language input. The second response may be generated by using the first natural language input and the NLU pool.

According to an embodiment, a plurality of second engines may be displayed in the second message in a sorted order. The second natural language input may indicate a selection of the second engine from among the plurality of second engines.

According to an embodiment, a server may include a housing, a communication circuit disposed inside the housing and configured to communicate with an electronic device, a processor disposed inside the housing and electrically connected to the communication circuit, and a memory disposed inside the housing and electrically connected to the processor. The memory may store a first NLU pool corresponding to a first domain. The memory may store instructions that, when executed, cause the processor to receive a natural language input from the electronic device by using the communication circuit, to determine whether context of the first domain is derived from the natural language input, if the context is derived, to generate a first response by using the natural language input and the first NLU pool, and to transmit the first response to the electronic device.

According to an embodiment, the first response may include content corresponding to the first domain.

According to an embodiment, the instructions may cause the processor, if the context of the first domain is not derived from the natural language input, to determine whether context of a second domain is derived from the natural language input, if the context the second domain is derived, to generate a second response indicating another server associated with the second domain, and to transmit the second response to the electronic device by using the communication circuit.

According to an embodiment, the other server may include a second NLU pool corresponding to the context of the second domain.

According to an embodiment, the memory may further store an application programming interface (API) for allowing an application executed by the electronic device to interact with instructions executed by the processor.

The term "module" used in this disclosure may represent, for example, a unit including one or more combinations of hardware, software and firmware. The term "module" may be interchangeably used with the terms "unit," "logic," "logical block," "component" or "circuit." The "module" may be an integrated component or may be a part thereof. The "module" may be implemented mechanically or electronically. For example, the "module" may include at least one of an application-specific IC (ASIC) chip, a field-programmable gate array (FPGA), and a programmable-logic device for performing the specified operations.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 460), may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, program instructions may include not only mechanical code such as those generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing;
   a touchscreen display exposed through a part of the housing;
   a communication circuit disposed inside the housing;
   a processor disposed inside the housing and electrically connected to the touchscreen display and the communication circuit; and
   a memory disposed inside the housing and electrically connected to the processor,
   wherein the memory is configured to store a messaging application program including a messaging user interface (UI), and
   wherein the memory stores instructions that, when executed, cause the processor to:
   display the messaging UI of the messaging application program on the touchscreen display;
   receive a natural language input from a user;
   transmit at least a portion of the natural language input to an external server by using the communication circuit;
   display, on the messaging UI, a first message based on the at least part of the natural language input and a first indication indicating the user;
   receive a first response from the external server via the communication circuit, wherein the first response is generated by a first engine based on the transmitted portion of the natural language input;
   display, on the messaging UI, a second indication indicating the first engine and a second message based on the first response;
   receive a second response from the external server via the communication circuit, wherein the second response is generated by a second engine based on the transmitted portion of the natural language input; and
   display, on the messaging UI, a third indication indicating the second engine and a third message based on the second response.

2. The electronic device of claim 1, wherein at least part of the first message includes a result of speech recognition of at least part of the natural language input.

3. The electronic device of claim 1, wherein the second message includes content associated with a first service corresponding to the first engine, and
   wherein the third message includes content associated with a second service corresponding to the second engine.

4. The electronic device of claim 1, wherein the first response is generated by the first engine by using a first natural language understanding (NLU) pool corresponding to the transmitted portion of the natural language input, and
   wherein the first NLU pool includes natural language associated with a first service corresponding to the first engine.

5. The electronic device of claim 3, wherein the first engine includes a first NLU module corresponding to a first domain.

6. The electronic device of claim 1, wherein the first indication, the second indication, or the third indication includes a text, an image, or a video.

7. The electronic device of claim 1, wherein the first indication is displayed adjacent to the first message,
   wherein the second indication is displayed adjacent to the second message, and
   wherein the third indication is displayed adjacent to the third message.

8. The electronic device of claim 1, wherein the natural language input is received as a text inputted through an input device.

9. The electronic device of claim 1, further comprising:
a microphone configured to convert speech of the user into an audio signal,
wherein the instructions further cause the processor to, when the natural language input is spoken by the user:
  transmit the audio signal to the external server via the communication circuit; and
  receive text data corresponding to the audio signal from the external server, wherein the text data constitutes at least part of the first message.

10. An electronic device comprising:
a housing;
a touchscreen display exposed through a part of the housing;
a communication circuit disposed inside the housing;
a processor disposed inside the housing and electrically connected to the touchscreen display and the communication circuit; and
a memory disposed inside the housing and electrically connected to the processor,
wherein the memory is configured to store a messaging application program including a messaging UI, and
wherein the memory further stores instructions that, when executed, cause the processor to:
  display the messaging UI of the messaging application program on the touchscreen display;
  receive a first natural language input from a user;
  transmit at least a portion of the first natural language input to an external server by using the communication circuit;
  display, on the messaging UI, a first message based on the at least part of the first natural language input and a first indication indicating the user;
  receive a first response from the external server via the communication circuit, wherein the first response is generated by a first engine based on the transmitted portion of the first natural language input and the first response indicates a second engine capable of generating a response corresponding to the first natural language input;
  display, on the messaging UI, a second indication indicating the first engine and a second message based on the first response;
  receive, from the user, a second natural language input indicating a selection of the second engine;
  display, on the messaging UI, the first indication and a third message based on the second natural language input;
  transmit at least a portion of the second natural language input to the external server by using the communication circuit;
  receive a second response from the external server via the communication circuit, wherein the second response is generated by the second engine based on the transmitted portion of the first natural language input; and
  display, on the messaging UI, a third indication indicating the second engine and a fourth message based on the second response.

11. The electronic device of claim 10, wherein the first response is received if the first engine is not associated with a domain corresponding to the first natural language input.

12. The electronic device of claim 10, wherein, if the first engine is not associated with a domain corresponding to the first natural language input, the transmitted portion of the first natural language input is transmitted to the second engine.

13. The electronic device of claim 10, wherein the first natural language input includes natural language associated with a service provided by the second engine.

14. The electronic device of claim 10, wherein the second engine includes an NLU pool of a domain corresponding to the first natural language input, and
wherein the second response is generated by using the first natural language input and the NLU pool.

15. The electronic device of claim 10, wherein a plurality of second engines are displayed in the second message in a sorted order, and
wherein the second natural language input indicates a selection of the second engine from among the plurality of second engines.

16. A server comprising:
a housing;
a communication circuit disposed inside the housing and configured to communicate with an electronic device;
a processor disposed inside the housing and electrically connected to the communication circuit; and
a memory disposed inside the housing and electrically connected to the processor,
wherein the memory stores a first NLU pool corresponding to a first domain, and
wherein the memory stores instructions that, when executed, cause the processor to:
  receive a natural language input from the electronic device by using the communication circuit;
  determine whether context of the first domain is derived from the natural language input;
  if the context is derived, generate a first response by using the natural language input and the first NLU pool;
  transmit the first response to the electronic device;
  if the context of the first domain is not derived from the natural language input, determine whether context of a second domain is derived from the natural language input,
  if the context the second domain is derived, generate a second response indicating another server associated with the second domain; and
  transmit the second response to the electronic device by using the communication circuit.

17. The server of claim 16, wherein the first response includes content corresponding to the first domain.

18. The server of claim 16, wherein the other server includes a second NLU pool corresponding to the context of the second domain.

19. The server of claim 16, wherein the memory further stores an application programming interface (API) for allowing an application executed by the electronic device to interact with instructions executed by the processor.

* * * * *